(12) United States Patent
Lobkis et al.

(10) Patent No.: US 11,982,648 B2
(45) Date of Patent: May 14, 2024

(54) ACTIVE WAVEGUIDE EXCITATION AND COMPENSATION

(71) Applicant: Etegent Technologies, Ltd., Cincinnati, OH (US)

(72) Inventors: Oleg Lobkis, Mason, OH (US); Richard A. Roth, Goshen, OH (US); Christopher G. Larsen, Cincinnati, OH (US); Stuart J. Shelley, Cincinnati, OH (US)

(73) Assignee: Etegent Technologies, Ltd., Cincinnati, OH (US)

( * ) Notice: Subject to any disclaimer, the term of this patent is extended or adjusted under 35 U.S.C. 154(b) by 666 days.

(21) Appl. No.: 17/107,646

(22) Filed: Nov. 30, 2020

(65) Prior Publication Data

US 2021/0372971 A1 Dec. 2, 2021

Related U.S. Application Data

(62) Division of application No. 15/302,836, filed as application No. PCT/US2015/025043 on Apr. 9, 2015, now Pat. No. 10,852,277.

(Continued)

(51) Int. Cl.
*G01L 11/06* (2006.01)
*F01D 17/08* (2006.01)
(Continued)

(52) U.S. Cl.
CPC ........... *G01N 29/326* (2013.01); *F01D 17/08* (2013.01); *F01D 17/085* (2013.01); *G01H 11/00* (2013.01);
(Continued)

(58) Field of Classification Search
CPC .. G01N 29/326; G01N 29/12; G01N 29/2462; G01N 2291/02827;
(Continued)

(56) References Cited

U.S. PATENT DOCUMENTS 801,130 A 10/1905 Barclay
2,786,981 A 3/1957 Zaleski
(Continued)

FOREIGN PATENT DOCUMENTS

CN 101251599 B * 9/2011
DE 2521411 A1 11/1976
(Continued)

OTHER PUBLICATIONS

U.S. Patent and Trademark Office, Office Action issued in U.S. Appl. No. 16/604,434, dated Sep. 16, 2021.
(Continued)

*Primary Examiner* — Lisa M Caputo
*Assistant Examiner* — Rose M Miller
(74) *Attorney, Agent, or Firm* — Gray Ice Higdon

(57) ABSTRACT

An environmental condition may be measured with a sensor (10) including a wire (20) having an ultrasonic signal transmission characteristic that varies in response to the environmental condition by sensing ultrasonic energy propagated through the wire using multiple types of propagation, and separating an effect of temperature on the wire from an effect of strain on the wire using the sensed ultrasonic energy propagated through the wire using the multiple types of propagation. A positive feedback loop may be used to excite the wire such that strain in the wire is based upon a sensed resonant frequency, while a square wave with a controlled duty cycle may be used to excite the wire at multiple excitation frequencies. A phase matched cone (200,
(Continued)

210) may be used to couple ultrasonic energy between a waveguide wire (202, 212) and a transducer (204, 214).

20 Claims, 13 Drawing Sheets

Related U.S. Application Data

(60) Provisional application No. 61/977,302, filed on Apr. 9, 2014.

(51) Int. Cl.

| | | |
|---|---|---|
| G01H 11/00 | (2006.01) | |
| G01L 1/10 | (2006.01) | |
| G01L 1/25 | (2006.01) | |
| G01N 29/07 | (2006.01) | |
| G01N 29/12 | (2006.01) | |
| G01N 29/24 | (2006.01) | |
| G01N 29/32 | (2006.01) | |
| G01P 15/097 | (2006.01) | |
| G01P 15/10 | (2006.01) | |
| F01D 17/02 | (2006.01) | |

(52) U.S. Cl.
CPC ............ *G01L 1/10* (2013.01); *G01L 1/255* (2013.01); *G01L 11/06* (2013.01); *G01N 29/07* (2013.01); *G01N 29/12* (2013.01); *G01N 29/2462* (2013.01); *G01P 15/10* (2013.01); *F01D 17/02* (2013.01); *F05D 2220/32* (2013.01); *G01L 1/106* (2013.01); *G01N 2291/0215* (2013.01); *G01N 2291/02827* (2013.01); *G01N 2291/02872* (2013.01); *G01N 2291/02881* (2013.01); *G01N 2291/0421* (2013.01); *G01N 2291/0422* (2013.01); *G01N 2291/0426* (2013.01); *G01N 2291/0427* (2013.01); *G01P 15/097* (2013.01)

(58) Field of Classification Search
CPC . G01N 2291/02872; G01N 2291/0421; G01N 2291/0422
USPC .................... 73/597, 587, 579, 617, 644
See application file for complete search history.

(56) References Cited

U.S. PATENT DOCUMENTS

| | | | |
|---|---|---|---|
| 2,968,943 A | 1/1961 | Statham | |
| 3,071,974 A | 1/1963 | Peterson | |
| 3,079,800 A | 3/1963 | Brooks | |
| 3,201,735 A | 8/1965 | Brown et al. | |
| 3,584,327 A | 6/1971 | Murry et al. | |
| 3,915,018 A | 10/1975 | Karplus | |
| 3,940,637 A | 2/1976 | Ohigashi et al. | |
| 4,100,809 A | 7/1978 | Bobrov | |
| 4,102,195 A | 7/1978 | Thompson et al. | |
| 4,149,422 A | 4/1979 | Olsen et al. | |
| 4,165,651 A | 8/1979 | Olsen et al. | |
| 4,165,652 A | 8/1979 | Olsen et al. | |
| 4,233,843 A | 11/1980 | Thompson et al. | |
| 4,336,719 A | 6/1982 | Lynnworth | |
| 4,414,652 A | 11/1983 | Crist | |
| 4,452,334 A | 6/1984 | Rogers | |
| 4,499,438 A | 2/1985 | Cornelius et al. | |
| 4,603,942 A | 8/1986 | Chang et al. | |
| 4,610,551 A | 9/1986 | Shah | |
| 4,650,346 A | 3/1987 | Tehon | |
| 4,663,965 A | 5/1987 | Metcalf et al. | |
| 4,667,097 A | 5/1987 | Fasching et al. | |
| 4,676,663 A | 6/1987 | Tehon | |
| 4,743,752 A | 5/1988 | Olsen et al. | |
| 4,743,870 A | 5/1988 | Jen et al. | |
| 4,783,997 A | 11/1988 | Lynnworth | |
| 4,800,316 A | 1/1989 | Ju-Zhen | |
| 4,823,600 A | 4/1989 | Biegel et al. | |
| 4,939,457 A | 7/1990 | Tellerman | |
| 5,003,825 A | 4/1991 | Lew | |
| 5,022,014 A | 6/1991 | Kulczyk et al. | |
| 5,044,769 A | 9/1991 | Kulczyk et al. | |
| 5,159,838 A | 11/1992 | Lynnworth | |
| 5,545,984 A | 8/1996 | Gloden et al. | |
| 5,670,720 A | 9/1997 | Clark et al. | |
| 5,713,916 A | 2/1998 | Dias | |
| 5,792,949 A | 8/1998 | Hewelt et al. | |
| 5,821,430 A | 10/1998 | Kwun et al. | |
| 5,821,743 A | 10/1998 | Page et al. | |
| 5,897,569 A | 4/1999 | Kellogg et al. | |
| 5,962,790 A | 10/1999 | Lynnworth et al. | |
| 6,047,602 A | 4/2000 | Lynnworth | |
| 6,081,638 A | 6/2000 | Zhou | |
| 6,185,155 B1 | 2/2001 | Steinich | |
| 6,232,769 B1 | 5/2001 | Brunsch et al. | |
| 6,281,976 B1 | 8/2001 | Taylor et al. | |
| 6,343,511 B1 | 2/2002 | Lynnworth et al. | |
| 6,413,103 B1 | 7/2002 | Merz et al. | |
| 6,611,081 B1 | 8/2003 | Okazaki et al. | |
| 6,889,552 B2 | 5/2005 | Nguyen et al. | |
| 6,912,907 B2 | 7/2005 | Fujimoto | |
| 6,919,779 B2 | 7/2005 | Raphalovitz et al. | |
| 6,975,179 B2 | 12/2005 | Harris | |
| 7,016,047 B2 | 3/2006 | May | |
| 7,017,415 B2 | 3/2006 | Harrold et al. | |
| 7,162,925 B2 | 1/2007 | Dietrich | |
| 7,258,014 B2 | 8/2007 | Rudkin | |
| 7,414,410 B2 | 8/2008 | Pharn et al. | |
| 7,450,021 B1 | 11/2008 | Gehm et al. | |
| 7,454,978 B2 | 11/2008 | Schroeder et al. | |
| 7,952,360 B2 | 5/2011 | Ganesh | |
| 8,146,422 B2 * | 4/2012 | Stein .................... A61B 5/4528 |
| | | | 600/587 |
| 8,297,835 B2 | 10/2012 | Girbig et al. | |
| 8,390,402 B2 | 3/2013 | Kunes | |
| 9,048,521 B2 | 6/2015 | Larsen et al. | |
| 9,182,306 B2 | 11/2015 | Roth, II et al. | |
| 9,472,840 B2 | 10/2016 | Herbsommer et al. | |
| 10,352,778 B2 | 7/2019 | Larsen et al. | |
| 10,854,941 B2 * | 12/2020 | Larsen ................ H01P 11/001 |
| 2002/0130253 A1 | 9/2002 | Yashiro et al. | |
| 2003/0056595 A1 | 3/2003 | Harrold et al. | |
| 2004/0119552 A1 | 6/2004 | Wray | |
| 2005/0012431 A1 | 1/2005 | Andle | |
| 2005/0144955 A1 | 7/2005 | Handelsman et al. | |
| 2005/0238301 A1 | 10/2005 | Russell et al. | |
| 2006/0290356 A1 | 12/2006 | Pharn et al. | |
| 2007/0068256 A1 | 3/2007 | Xu et al. | |
| 2008/0090023 A1 | 4/2008 | Nayar et al. | |
| 2008/0232197 A1 | 9/2008 | Kojima et al. | |
| 2008/0307885 A1 | 12/2008 | Ravitch et al. | |
| 2009/0038904 A1 | 2/2009 | Bosk | |
| 2009/0314088 A1 | 12/2009 | Djordjevic et al. | |
| 2011/0314919 A1 | 12/2011 | Ehlert | |
| 2012/0242426 A1 | 9/2012 | Larsen et al. | |
| 2012/0266676 A1 | 10/2012 | Mueller et al. | |
| 2012/0325018 A1 | 12/2012 | Roth, II et al. | |
| 2014/0144156 A1 | 5/2014 | Lang et al. | |
| 2015/0175095 A1 | 6/2015 | Inao et al. | |
| 2015/0377836 A1 | 12/2015 | Lanza et al. | |
| 2016/0273973 A1 | 9/2016 | Larsen et al. | |
| 2016/0294033 A1 | 10/2016 | Larsen et al. | |
| 2017/0030871 A1 | 2/2017 | Lobkis et al. | |
| 2019/0157733 A1 | 5/2019 | Larsen et al. | |
| 2020/0240937 A1 | 7/2020 | Landy et al. | |
| 2021/0132008 A1 | 5/2021 | Roth et al. | |

FOREIGN PATENT DOCUMENTS

| | | |
|---|---|---|
| DE | 10200510011402 A1 | 9/2006 |
| DE | 102007062864 A1 | 6/2009 |
| EP | 0053036 A1 | 6/1982 |
| EP | 0467818 A1 | 1/1992 |
| EP | 1014525 A1 | 6/2000 |

(56) References Cited

FOREIGN PATENT DOCUMENTS

| | | |
|---|---|---|
| EP | 1238715 A1 | 9/2002 |
| EP | 1566815 A2 | 8/2005 |
| EP | 2194325 A1 | 6/2010 |
| GB | 2114297 A | 8/1983 |
| JP | 61061027 A | 3/1986 |
| WO | WO2001035133 A1 | 5/2001 |
| WO | WO2007136040 A1 | 11/2007 |
| WO | WO 2013053699 | 4/2013 |
| WO | WO2015/066494 A2 | 5/2015 |
| WO | WO2015/099884 A2 | 7/2015 |
| WO | WO2016016631 A1 | 2/2016 |
| WO | WO2016/162880 A1 | 10/2016 |
| WO | WO2015157488 A1 | 2/2017 |
| WO | WO2018/191290 A1 | 10/2018 |
| WO | WO 2018/226310 A2 | 12/2018 |
| WO | WO2019018021 A2 | 1/2019 |

OTHER PUBLICATIONS

U.S. Patent and Trademark Office, Office Action issued in U.S. Appl. No. 16/604,431, dated Feb. 7, 2022.

U.S. Patent and Trademark Office, Notice of Allowance issued in U.S. Appl. No. 16/604,431, dated Jul. 27, 2022.

U.S. Patent and Trademark Office, Office Action issued in application serial No. 16/604,4261, dated Jul. 15, 2022.

Written Opinion of the International Searching Authority for PCT/US2012/043766, dated Nov. 21, 2012. (13WO).

International Search Report and Written Opinion of PCT Ser. No. PCT/US14/63463, dated Mar. 26, 2015. (18WO).

International Search Report and the Written Opinon for PCT/US2014/63409, dated Jun. 24, 2015. (19WO).

International Search Report and the Written Opinion for PCT/US2015/25043, dated Aug. 4, 2015. (20WO).

Kulite, Static-Dynamic Transducer, Jun. 17, 2009 (6 pages).

Hunter, Gary W., Development and Application of High Temperature Sensors and Electronics, NASA Glenn Research Center, Cleveland, OH (26 pages).

Kurtz, Dr. Anthony D., "Miniature Absolute Pressure Transducer," AFSBIR, Control No. F031-1261 (2003).

Ned, Alexander A.; Kurtz, Dr. Anthony D.; Masheeb, Fawzia; Beheim, Glenn, Leadless SiC Pressure Sensors for High Temperature Applications, 2001 (6 pages).

Ned, Alexander A.; Kurtz, Anthony D.; Beheim, Glenn; Masheeb, Fawzia; Stefanescu, Sorin; Improve SiC Leadless Pressure Sensors For High Temperature Low and High Pressure Applications; Kulite Semiconductor Products, Inc., presented at the 21st Transducer Workshop.

Wijesundara, Muthu, Recent Progress in SiC Sensors and Microsystems for Harsh Environments (19 pages).

Inagaki, K.; Kolosov, O.V.; Briggs, G. A. D.; Wright, O. B.; Waveguide ultrasonic force microscopy at 60 MHz; Applied Physics Letters, vol. 76, No. 14, Apr. 3, 2000 (3 pages).

Schuet, S; Wheeler, K.; Timucin, D.; Kowalski, M.; Wysocki, P.; Introduction & Motivation Characterization of Chafing Damage Model Based Inference, Model Based Inference for Wire Chafe Diagnostics, Intelligent Systems Division, NASA Ames Research Center, Moffett Field.

Rose, Joseph L., A Baseline and Vision of Ultrasonic Guided Wave Inspection Potential, Journal of Pressure Vessel Technology, Aug. 2002, vol. 124, pp. 273-282.

Neill, Ian T.; Oppenheim, I. J.; Greve, D.W.; A Wire-Guided Transducer for Acoustic Emission Sensing, Sensors and Smart Structures Technologies for Civil, Mechanical, and Aerospace Systems, 2007, Proc. of SPIE vol. 6529 652913-1 (8 pages).

Stobbe, David M., Acoustoelasticity in 7075-T651 Aluminum and Dependence of Third Order Elastic Constants on Fatigue Damage, A thesis Presented to The Academic Faculty, School of Mechanical Engineering, Georgia Institute of Technology, Aug. 2005 (91 pages).

Ali, M.G.S., Analysis of Broadband Piezoelectric Transducers by Discrete Time Model, Egypt. J. Sol., vol. (23), No. (2), (2000), pp. 287-295.

Greve, David W.; Sohn, Hoon; Yue, C. Patrick; Oppenheim, Irving J., An Inductively Coupled Lamb Wave Transducer, IEEE Sensors Journal, vol. 7, No. 2, Feb. 2007, pp. 295-301.

Huang, Bin; Shung, K. Kik, Characterization of very high frequency transducers with wire target and hydrophone, Institute of Physics Publishing, Journal of Physics: Conference Series 1 (2004) 161-166.

Hollman, Kyle W.; Holland, Mark R.; Miller, James G.; Nagy, Peter B.; Rose, James H., Effective Ultrasonic transmission coefficient for randomly rough surfaces, J. Acoust. Soc. Am. 100 (2), Pt. 1, Aug. 1996, pp. 832-839.

Kwun, Hegeon; Bartels, Keith A.; Hanley, John J., Effects of tensile loading on the properties of elastic-wave propagation in a strand, J. Acoust. Soc. Am 103 (6), Jun. 1998, pp. 3370-3375.

Nieuwenhuis, J. H.; Neumann, J.; Greve, D.W.; Oppenheim, I.J., Generation and detection of guided waves using PZT wafer transducers, Nov. 2005 (19 pages).

Chaki, S.; Bourse, G., Guided ultrasonic waves for non-destructive monitoring of the stress levels in prestressed steel strands, Ultrasonics 49 (2009) 162-171.

Li, Qiuhua; Lieh, Junghsen; Mayer, A, Large deflection of laminated circular plates with clamed edge and uniform loading, Proc. IMechE vol. 219 Part E: J. Process Mechanical Engineering (2005) (6 pages).

Sheplak, Mark; Dugundji, John, Large Deflections of Clamped Circular Plates Under Initial Tension and Transitions to Membrane Behavior, Journal of Applied Mechanics, 1998 (28 Pages).

Behbahani, Alireza R., Need for Robust Sensors for Inherently Fail-Safe Gas Turbine Engine Controls, Monitoring, and Prognostics, May 7, 2006 through Thursday, May 11, 2006, ISA2006, 52nd International Instrumentation Symposium—Cleveland, OH (37 pages).

Di Scalea, Francesco Lanza; Rizzo, Piervincenzo; Seible, Frieder, Stress Measurement and Defect Detection in Steel Strands by Guided Stress Waves, Journal of Materials in Civil Engineering © ASCE/May/Jun. 2003, pp. 219-227.

Miklowitz, Julius, The Theory of Elastic Waves and Waveguides, North-Holland Series in Applied Mathematics and Mechanics, vol. 22, 1978 (634 pages).

Nagy, Peter B.; Kent, Renee M., Ultrasonic assessment of Poisson's ratio in thin rods, J. Acoust. Soc. Am. 98 (5), Pt. 1, Nov. 1995, pp. 2694-2701.

Konkov, E., Ultrasonic Interferometer for High-Accuracy Linear Measurements, Measurement Science Review, vol. 9, No. 6, 2009, pp. 187-188.

Nicholson, N.C. and McDicken, W.N., "Waveguides in medical ultrasonics: effect of waveguide medium upon model amplitude," Ultrasonics 1992 vol. 30, No. 2. (pp. 82-86).

Spratt, William K.; Vetelino, John F.; Lynnworth, Lawrence C., "Torsional Ultrasonic Waveguide Sensor," 2010 IEEE International Ultrasonics Symposium Proceedings (pp. 702-706).

Loveday, Philip W., "Analysis of Piezoelectric Ultrasonic Transducers Attached to Waveguides Using Waveguide Finite Elements," IEEE Transactions on Ultrasonics, Ferroelectrics, and Frequency Control, vol. 54, No. 10, Oct. 2007 (pp. 2045-2051).

Lee, Jung-Ryul and Tsuda, Hiroshi, "Sensor application of fibre ultrasonic waveguide," Meas. Sci. Technol. 17 (2006) pp. 645-652.

Cegla, F.B.; Cawley, P., "Ultrasonic Waveguides for Remote High Temperature NDT," Non-Destructive Testing Group, Department of Mechanical Engineering, Imperial College London SW7 2AZ, United Kingdom.

Redwood, Martin, Mechanical waveguides; the propagation of acoustic and ultrasonic waves in fluids and solids with boundaries, New York, Pergamon Press. 1960.

U.S. Patent and Trademark Office, Restriction issued in related U.S. Appl. No. 13/166,594, dated Oct. 25, 2013.

U.S. Patent and Trademark Office, Restriction issued in related U.S. Appl. No. 13/166,594, dated Mar. 14, 2014.

U.S. Patent and Trademark Office, Office Action issued in related U.S. Appl. No. 13/166,594, dated Jul. 24, 2014.

(56) References Cited

OTHER PUBLICATIONS

U.S. Patent and Trademark Office, Final Office Action issued in related U.S. Appl. No. 13/166,594, dated Feb. 17, 2015.
U.S. Patent and Trademark Office, Advisory Action issued in related U.S. Appl. No. 13/166,594, dated May 14, 2015.
U.S. Patent and Trademark Office, Office Action issued in related U.S. Appl. No. 13/166,594, dated Jun. 19, 2015.
U.S. Patent and Trademark Office, Notice of Allowance issued in related U.S. Appl. No. 13/166,594, dated Aug. 7, 2015.
U.S. Patent and Trademark Office, Notice of Allowance issued in related U.S. Appl. No. 13/166,594, dated Sep. 17, 2015.
U.S. Patent and Trademark Office, Office Action issued in related U.S. Appl. No. 13/071,159, dated Apr. 23, 2014.
U.S. Patent and Trademark Office, Final Office Action issued in related U.S. Appl. No. 13/071,159, dated Oct. 24, 2014.
U.S. Patent and Trademark Office, Notice of Allowance issued in related U.S. Appl. No. 13/071,159, dated Apr. 15, 2015.
U.S. Patent and Trademark Office, Office Action issued in related U.S. Appl. No. 15/033,383, dated Apr. 3, 2018.
U.S. Patent and Trademark Office, Office Action issued in related U.S. Appl. No. 15/033,350, dated Jun. 29, 2018.
U.S. Patent and Trademark Office, Office Action issued in related U.S. Appl. No. 15/033,383, dated Nov. 1, 2018.
U.S. Patent and Trademark Office, Office Action issued in related U.S. Appl. No. 16/237,397, dated Oct. 21, 2019.
International Search Report and the Written Opinon for PCT/US2018/26935, dated Feb. 19, 2019. (19WO).
International Search Report and the Written Opinon for PCT/US2018/26937, dated Jan. 8, 2019. (19WO).
International Search Report and the Written Opinon for PCT/US2018/26940, dated Jun. 28, 2018. (19WO).
U.S. Patent and Trademark Office, Notice of Allowance issued in related U.S. Appl. No. 15/033,383, dated Apr. 2, 2019.
U.S. Patent and Trademark Office, Final Office Action issued in related U.S. Appl. No. 16/237,397, dated Apr. 1, 2020.

\* cited by examiner

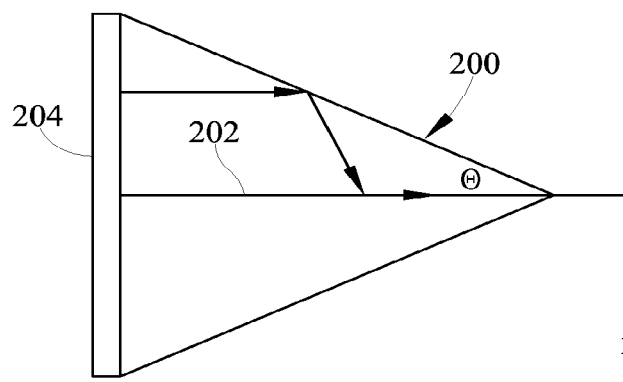
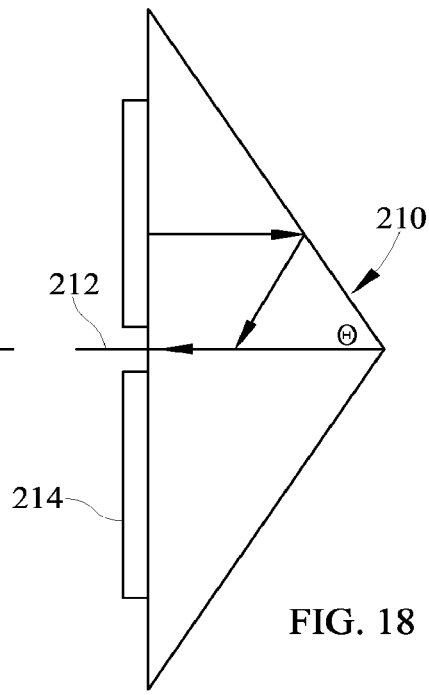
FIG. 17
FIG. 18
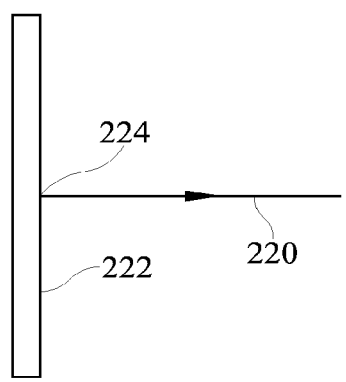
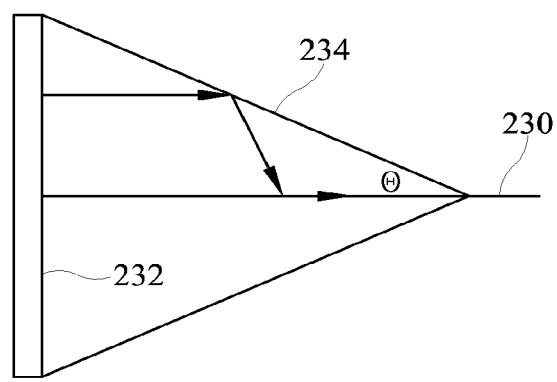
FIG. 19
FIG. 20

ACTIVE WAVEGUIDE EXCITATION AND COMPENSATION

GOVERNMENT RIGHTS

Certain aspects of this invention were made with government support under Grant/Contract Nos. N68335-11-C-0203 and N68335-11-C-0385 awarded by the Naval Air Warfare Center (NAVAIR). The U.S. Government may have certain rights in the invention.

FIELD OF THE INVENTION

The present invention relates to sensing technology, and more particularly to sensors and sensing methods using active waveguides.

BACKGROUND OF THE INVENTION

Many conventional mechanical systems are monitored to determine operating conditions such as pressure, temperature, vibrations, etc. However, in many systems it is desirable to monitor and measure operating conditions at locations in the system where it is extremely difficult to do so. For example, the measurement environment may be a harsh environment in which sensors are unable to operate reliably. For example, monitoring an aero gas turbine engine presents unique challenges due to the harsh environmental conditions of the engine, i.e., high temperatures, high pressures, and high vibrations a sensor is subjected to during operation of the engine. In mechanical systems, conventional sensors used to monitor operating conditions in harsh environments often fail at an extremely high rate and lead to high maintenance costs in maintaining the mechanical system due to limits associated with the materials required to construct the sensors. In addition, conventional sensors typically require a variety of materials to be bonded together, which can complicate sensor design due to the varying environmental condition limits of these materials, and which can lead to increased failure rates due to some required materials having low environmental condition limits.

Conventional methods of dealing with the above issues typically involve acknowledging the limits associated with a sensor, the lifetime of the sensor, and that its lifetime and measurement capabilities are limited by the environment within which it is configured. In some systems, conventional methods of dealing with the above issues typically involve installing a sensor in a location remote from the desired sensing location and estimating operating conditions at the desired sensing location based on the data collected from the remote position.

Sensors have also been developed utilizing a single material to minimize thermal strains and the challenges associated with bonding dissimilar materials, as well as one or more wires coupled to and/or integrated with the sensors and functioning as active waveguides through which ultrasonic signals may be propagated and sensed to measure the environmental conditions, e.g., pressure, force, strain, temperature, etc., to which the sensors are subjected. In some instances, the wires may be tensioned and/or coupled to one or more diaphragms such that pressure differences or other forces deflect the diaphragms and induce varying tension and/or elongation of the wires, which in turn vary the ultrasonic signal transmission characteristics of the wires in a measurable manner.

Nonetheless, in some instances, various environmental conditions can contribute to the ultrasonic signal transmission characteristics of the wires used as active waveguides, resulting in a need to compensate for some environmental conditions when attempting to measure other environmental conditions.

In addition, in some instances, generating and detecting ultrasonic energy in the wires used as active waveguides, and in particular, transmitting ultrasonic energy to an active waveguide wire from a transducer and/or receiving ultrasonic energy from an active waveguide wire with a receiver can be subject to energy losses that reduce signal strength and signal to noise ratio.

Consequently, there is a continuing need for improved sensors and sensing methods to address these and other difficulties with conventional sensor technology.

SUMMARY OF THE INVENTION

Embodiments of the invention are generally directed to various improvements in the excitation and compensation in an active waveguide, e.g., as used with sensors that measure environmental conditions using ultrasonic energy.

In one regard, embodiments consistent with the invention may utilize multi-shape propagation of ultrasonic energy to facilitate separation of temperature effects from strain effects on a wire waveguide. Consistent with one embodiment of the invention, for example, an environmental condition may be measured with a sensor of the type that includes a wire having an ultrasonic signal transmission characteristic that varies in response to the environmental condition by sensing ultrasonic energy propagated through the wire using multiple types of propagation, and separating an effect of temperature on the wire from an effect of strain on the wire using the sensed ultrasonic energy propagated through the wire using the multiple types of propagation.

In another regard, embodiments consistent with the invention may utilize resonance-based detection of strain in a waveguide sensor, e.g., based upon the resonant frequency of ultrasonic energy propagated in a waveguide wire and fed back through a positive feedback loop. Consistent with another embodiment of the invention, an environmental condition may be measured with a sensor of the type that includes a wire having an ultrasonic signal transmission characteristic that varies in response to the environmental condition by sensing a resonant frequency of ultrasonic energy propagated through the wire in a positive feedback loop, and determining a strain in the wire based upon the sensed resonant frequency.

In yet another regard, embodiments consistent with the invention may generate multiple excitation frequencies by using a square wave with a controlled duty cycle as an excitation source for a waveguide sensor. Consistent with such an embodiment, an environmental condition may be measured with a sensor of the type that includes a wire having an ultrasonic signal transmission characteristic that varies in response to the environmental condition, and that is measured by generating a square wave ultrasonic signal having a duty cycle and propagating ultrasonic energy through the wire in response to the square wave ultrasonic signal such that the wire is excited by the ultrasonic energy at multiple excitation frequencies based upon the duty cycle of the square wave. The sensing of the ultrasonic energy propagated through the wire at each of the different frequencies may be used to determine the strain in the wire.

In still another regard, embodiments consistent with the invention may utilize a phase-matched cone to optimize the propagation of ultrasonic energy between a waveguide wire and a transducer. Consistent with such an embodiment, a sensor may include a waveguide wire and a phase matched cone coupled to the waveguide wire and configured to couple ultrasonic energy between the wave-guide wire and a transducer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 17 and 18 are cross-sectional illustrations of example small aperture and large aperture phase-matched cones consistent with embodiments of the invention.

FIGS. 19 and 20 are cross-sectional illustrations of direct guided wave excitation to a waveguide wire (FIG. 19) and excitation using a phase matched cone (FIG. 20).

DETAILED DESCRIPTION

Figure 1:
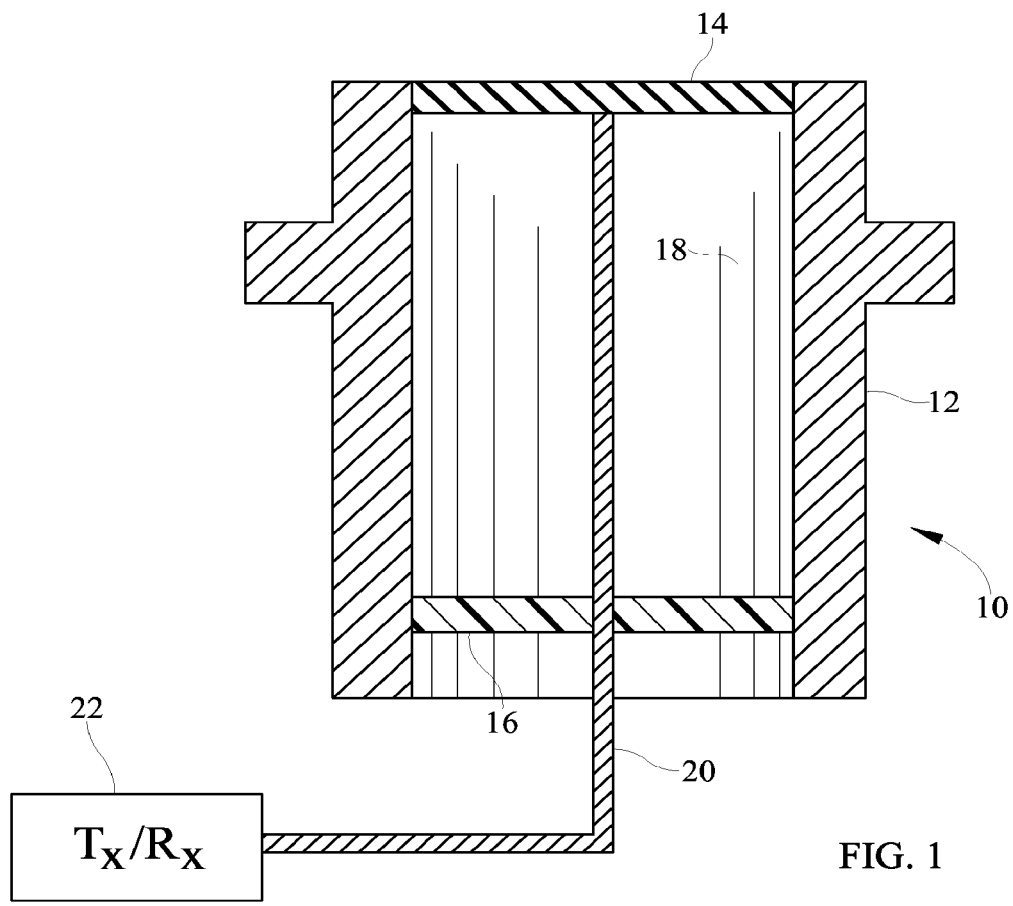
FIG. 1 is a cross-sectional illustration of an example waveguide sensor consistent with embodiments of the invention and used to sense pressure.

Embodiments of the invention are generally directed to various improvements related to a waveguide sensor and a sensing method, in which signals communicated over one or more wires are monitored such that environmental conditions may be measured based at least in part on characteristics of the communicated signals, where the environmental conditions include conditions such as pressure, force, temperature, acceleration, strain, and/or vibration. Further details regarding various waveguide sensor designs that may utilize the herein-described improvements are described in U.S. Patent Publication No. 2012/0325018 by Richard Allan Roth, II et al., which is assigned to Etegent Technologies Ltd. (the same assignee as the present application), and which is incorporated by reference herein in its entirety.

Sensors consistent with embodiments of the invention may be constructed of a single material, thereby minimizing thermal strains and challenges associated with bonding dissimilar materials. Moreover, embodiments of the invention may be constructed using a variety of materials, thereby allowing selection of one or more construction materials based on material properties. Suitable materials for housings, diaphragms, and attachment plates include, for example metals and alloys such as steel, stainless steel alloys, titanium and titanium alloys, nickel and nickel alloys, superalloys (e.g. Inconel® variations or Hayes® variations), refractory metals and their alloys, ceramics, and other materials suitable for harsh environments (i.e. high temperature, high pressure, and/or high vibration environments). Suitable materials for wires include, for example metals and alloys such as steel, stainless steel alloys, titanium and titanium alloys, nickel and nickel alloys, superalloys (e.g. nickel, cobalt, nickel-iron superalloys, for example Inconel® variations), ceramics, and other materials suitable for harsh environments (i.e. high temperature, high pressure, and/or high vibration). It will be appreciated that housings, diaphragms, attachment plates and wires in a single sensor design may all be constructed of the same material in some embodiments, while in other embodiments, heterogeneous materials may be used for some of these components.

Embodiments consistent with the present invention may utilize ultrasonic signals, and measure environmental conditions based at least in part on the ultrasonic signals. Ultrasonic signals may generally be transmitted over a large distance, which enables equipment associated with an ultrasonic sensor to be located remote from the desired sensing location, while still being able to measure environmental conditions at the desired sensing location by utilizing sensors consistent with embodiments of the invention positioned in the desired sensing location.

In some embodiments of the invention, the sensor may measure the length change of the tensioned wire. The length of the wire may be found by measuring a varying ultrasonic signal transmission characteristic of the wire. In some embodiments, the varying ultrasonic signal transmission characteristic may include phase of an ultrasonic signal, amplitude of an ultrasonic signal, frequency of an ultrasonic signal, and/or propagation delay of an ultrasonic signal. Consistent with embodiments of the invention, an environmental condition monitored by the sensor may be measured by measuring the difference in one or more of the ultrasonic signal transmission characteristics.

For example, in some embodiments, the sensor may be configured at a sensing location such that the diaphragm separates a pressure difference. In this exemplary embodiment, a force may act on the diaphragm due to the pressure difference across the diaphragm. In this example, the force may deflect the diaphragm in the direction of lower pressure, and the tension of the wire may increase or decrease corresponding to the direction of deflection of the diaphragm. In this example, an ultrasonic signal transmission characteristic may vary as the tension of the wire varies. In this example, an ultrasonic signal may be transmitted through the wire, and a sensed ultrasonic signal may be compared to a reference ultrasonic signal to determine the variance in the ultrasonic signal transmission characteristic. Furthermore, the pressure in the sensing location may be determined based at least in part on the determined variance between the sensed ultrasonic signal transmission characteristic and the reference ultrasonic signal transmission characteristic.

In some other embodiments, the sensor may be configured such that the sensing portion of the sensor extends into an area. The sensing portion may be constructed such that two or more ultrasonic reflections are generated in the sensing portion. As temperature changes in the area the ultrasonic signal transmission characteristic may vary as the tension of the wire varies. In this example, an ultrasonic signal may be transmitted through the wire, and a sensed ultrasonic signal may be compared to a reference ultrasonic signal to determine the variance in the ultrasonic signal transmission characteristic. Furthermore, the temperature in the sensing location may be determined based at least in part on the determined variance between the sensed ultrasonic signal transmission characteristic and the reference ultrasonic signal transmission characteristic. Also, in some embodiments, the ultrasonic variation may be measured by detecting a change in resonance frequency.

Systems and methods consistent with various aspects of the invention may be utilized to transmit and sense ultrasonic signals. In some embodiments, an ultrasonic signal may be transmitted through the wire, and the sensed ultrasonic signal may include a reflection or echo of the transmitted ultrasonic signal. In some embodiments, an ultrasonic signal may be transmitted through the wire, and the sensed ultrasonic signal may include a portion of the transmitted ultrasonic signal. In some embodiments, an ultrasonic signal may be transmitted through the wire, and the sensed ultrasonic signal may be a modification of the transmitted ultrasonic signal. In other embodiments, a wire may have a first end and a second end, and an ultrasonic signal may be transmitted through the wire at the first end, and an ultrasonic signal may be sensed through the wire at a second end, and the sensed ultrasonic signal may be based at least in part on the transmitted ultrasonic signal. The frequency of a transmitted ultrasonic signal may vary in different embodiments, although in many embodiments, a transmitted ultrasonic signal of between about 100 KHz and about 50 MHz, or more particularly a signal of between about 1 MHz and about 5 MHz, may be used.

As the sensors may be positioned to measure environmental conditions in sensing locations typically considered harsh sensing environments, materials suitable for harsh environments may be utilized in various combinations to construct sensors consistent with some embodiments of the invention. Moreover, the materials and configurations of wires consistent with embodiments of the invention may comprise similarly suitable materials. In addition, wires consistent with embodiments of the invention generally include material properties making the wires suitable for transmission of ultrasonic signals, including for example, various metals and alloys including those described above. Furthermore, while some embodiments include wires comprising a uniform construction, other embodiments may include wires advantageously comprising braided constructions, where braided constructions may provide higher tensile strengths in some embodiments. Uniformly constructed and braided wires comprising diameters between about 0.001 inches and 0.50 inches, or more particularly diameters between 0.005 inches and 0.25 inches may be used. The cross-sectional shapes of wires may vary in different embodiments, although in many embodiments, the cross-sectional shapes in many embodiments may include shapes that may be configured to transmit ultrasonic signals consistent with embodiments of the invention, including, for example substantially circular cross-sectional wires, substantially rectangular cross-sectional wires, substantially ribbon cross-sectional wires, etc.

Turning to the drawings, where like numbers denote like parts throughout the several views, FIG. 1 illustrates an example waveguide sensor 10 suitable for use in connection with various of the embodiments discussed herein. Sensor 10 in this embodiment is configured as a pressure sensor and includes a housing 12, a diaphragm 14, and an attachment plate 16, such that an interior 18 may be defined. Sensor 10 may include a wire 20, where at least a portion of wire 20 may be coupled in tension between the diaphragm 14 and the attachment plate 16 and positioned in interior 18. One or more ultrasonic signal transmission characteristics of wire 20 may vary as the tension of the portion of wire 20 coupled in tension between the diaphragm 14 and the attachment plate 16 changes. As shown in FIG. 1, sensor 10 may be coupled to transmitting and receiving circuitry 22 (i.e. transceiving circuitry) operatively connected to wire 20.

Transceiving circuitry 22 may comprise separate transmitting circuitry and receiving circuitry operatively connected to a common end of wire 20. In other embodiments, transceiving circuitry 22 may comprise transmitting and receiving circuitry commonly configured together.

In embodiments including a common transmitting and receiving end, such as the sensor shown in FIG. 1, a pulse/echo transmitting and sensing method may be utilized. In these embodiments, an ultrasonic signal may be transmitted through wire 20, and an ultrasonic signal may be sensed from wire 20, where the sensed ultrasonic signal may comprise an echo of the transmitted ultrasonic signal. As such, analysis of the sensed ultrasonic signal to determine a pressure measurement associated with a force acting on diaphragm 14 may include comparing the transmitted ultrasonic signal to the sensed echo. As the ultrasonic signal transmission characteristics of wire 20 may vary as the tension or strain on the tensioned portion of wire 20 changes in response to the force on the diaphragm 14, the transmitted ultrasonic signal may include one or more signal characteristics that differ from the sensed echo. The transmitted ultrasonic signal and the sensed echo may therefore be analyzed to determine one or more signal characteristics that vary between the transmitted ultrasonic signal and the sensed echo, and may therefore determine one or more ultrasonic signal transmission characteristics of wire 20 that varied in response to the change in tension of the tensioned portion of wire 20.

Based at least in part on the determined variance of at least one ultrasonic signal transmission characteristic of wire 20, a measurement of the pressure associated with the force acting on the diaphragm 14 may be determined. As such, in some embodiments, a sensor utilizing a pulse/echo ultrasonic signal transmission and sensing method may determine a measurement of a pressure associated with a force acting on diaphragm 14.

In some embodiments consistent with the invention, an ultrasonic signal may be compared to a reference ultrasonic signal to determine a variance of one or more ultrasonic signal transmission characteristics of wire 20 that varied as a result of a deflection of diaphragm 14. Furthermore, in some embodiments, a measurement of an environmental condition of sensing location 14 may be generated based at least in part on the determined ultrasonic signal transmission characteristic variance of wire 20.

Figure 2:
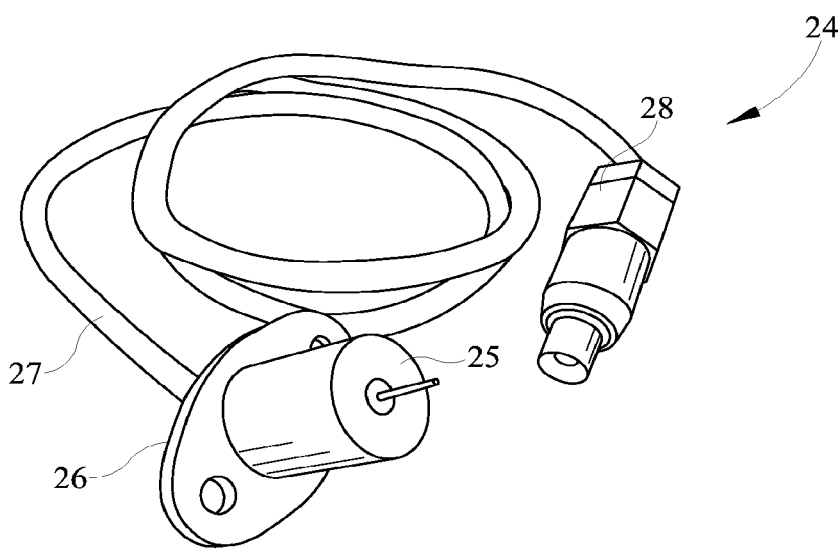
FIG. 2 is an illustration of another example waveguide sensor consistent with embodiments of the invention and used to sense temperature.

It will be appreciated that a waveguide sensor consistent with the invention may be used to measure other environmental conditions, including for example, heat flux, strain etc. Moreover, a waveguide sensor may be used to measure temperature. FIG. 2, for example, illustrates a temperature sensor 24 including a probe 25, housing 26, waveguide 27 and transducer 28. One or more steps, notches or other geometry changes, e.g., within waveguide 27 and/or probe 25, may be used to create one or more reflections in an ultrasonic signal. As noted above, two or more ultrasonic reflections may be generated in a sensing portion of the sensor, e.g., in probe 25, and as temperature changes in the sensing area the ultrasonic signal transmission characteristic may vary as the tension of the wire varies. In some instances, an ultrasonic signal may be transmitted through the wire, and a sensed ultrasonic signal may be compared to a reference ultrasonic signal to determine the variance in the ultrasonic signal transmission characteristic. Furthermore, the temperature in the sensing location may be determined based at least in part on the determined variance between the sensed ultrasonic signal transmission characteristic and the reference ultrasonic signal transmission characteristic.

Figure 3:
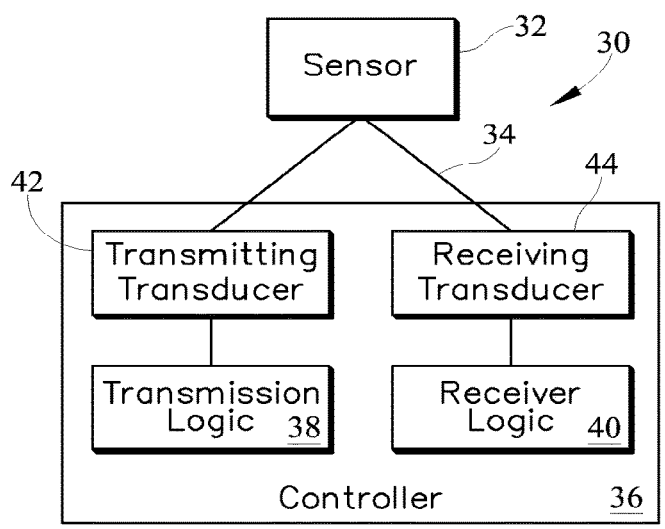
FIG. 3 is a block diagram of one embodiment of an apparatus including the sensor of FIG. 1.

FIG. 3 illustrates an example apparatus 30 consistent with embodiments of the invention and to measure an environmental condition in a sensing location, which may be in a harsh environment. Apparatus 30 may include a sensor 32 including a waveguide wire 34 coupled to a controller 36. In this embodiment, controller 36 includes separate transmission and receiver logic 38, 40, as well as separate transmitting and receiving transducers 42, 44 coupled to opposite ends of wire 34. Thus, unlike sensor 10 of FIG. 1, ultrasonic energy is introduced at one end of wire 34 and sensed at the other end of wire 34, and a transmission characteristic such as propagation delay is used to sense an environmental condition. In this embodiment, transmission logic 38 generates an excitation signal that is received by transmitting transducer 42 and used by transducer 42 coupled to one end of wire 34 to impart ultrasonic energy corresponding to the excitation signal to the wire. Receiving transducer 44 coupled to the other end of wire 34 demodulates the ultrasonic energy propagated through wire 34 and generates a return signal that is transmitted to receiver logic 40, which then processes the return signal to determine the environmental condition.

Figure 4:
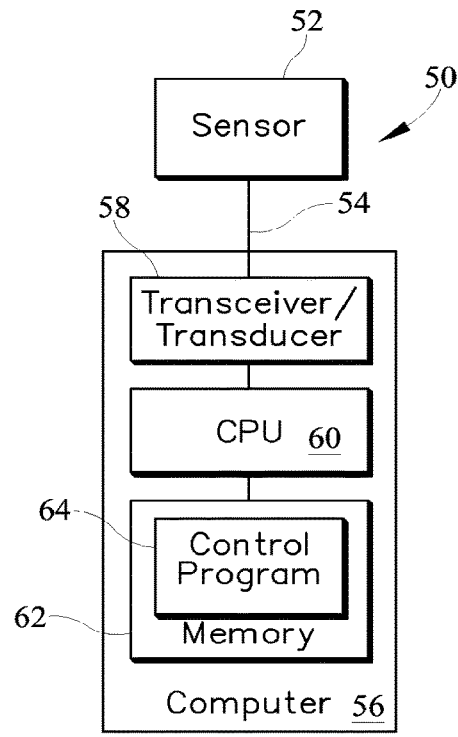
FIG. 4 is a block diagram of another embodiment of an apparatus including the sensor of FIG. 1.

FIG. 4 illustrates an alternate apparatus 50 consistent with other embodiments of the invention and to measure an environmental condition in a sensing location using a sensor 52 including a waveguide wire 54 coupled to a computer 56 including transceiver/transducer logic 58, a central processing unit 60 including at least one processor, and a memory 62 within which is stored a control program 64 that, when executed, both generates a signal that causes excitation of wire 54 with ultrasonic energy as well as processes a return signal that is representative of the propagated ultrasonic signal to determine the environmental condition.

As should be apparent from FIGS. 3-4, various hardware and/or software configurations may be utilized to implement the herein-described functionality, and may include dedicated hardware logic disposed in one or more electronic circuits and/or integrated circuits, and/or programmable logic and/or a programmable electronic device such as a computer that executes program code. In addition, in some embodiments, processing may be implemented using approaches other than a computer, such as analog preprocessing and a timer. Furthermore, it should be appreciated that the functionality associated with generating an excitation signal, exciting a wire to impart ultrasonic energy and stress waves to the wire in response to such an excitation signal, receiving, detecting or sensing the propagated ultrasonic energy (whether transmitted or reflected), generating a return signal representative of such propagated ultrasonic energy, and processing the return signal to calculate a measurement for an environmental condition, and compensate for other environmental conditions and effects may be combined or separated in various embodiments consistent with the invention.

In addition, any software routines executed to implement the embodiments disclosed herein, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, embedded hardware, etc., and that, when read and executed by one or more processors in a computer, cause that computer to perform the steps necessary to execute steps or elements embodying desired functionality. Moreover, while some embodiments have and hereinafter will be described in the context of fully functioning computers and computer systems, those skilled in the art will appreciate that some embodiments are capable of being distributed as a program product in a variety of forms, and that the invention applies equally regardless of the particular type of computer readable media used to actually carry out the distribution, including, for example, computer readable storage media, which is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In addition, as is generally known in the field, signal processing methods including filtering, demodulation, and Hilbert transform processing methods may be used to determine one or more ultrasonic signal transmission characteristics. In some embodiments, an apparatus may perform one or more signal processing operations on the ultrasonic signal sensed on a wire to determine one or more ultrasonic signal transmission characteristics of the wire as well as the variance of one or more ultrasonic signal transmission characteristics of the wire.

Those skilled in the art will recognize that the example environments illustrated in FIGS. 1-4 are not intended to limit the invention. Indeed, other modifications that may be made to the aforementioned embodiments, e.g., as described in the aforementioned publication incorporated by reference herein, will be apparent to one of ordinary skill in the art having the benefit of the instant disclosure.

Multi-Shape Propagation and Temperature Compensation

It is well understood and studied that the velocity of an ultrasonic stress wave changes significantly with temperature. One of the main issues with measuring strain in a wire is that it may be difficult to separate the effects of temperature from the effects of strain, as both effects typically cause some delay in a propagated ultrasonic signal.

Embodiments consistent with the invention facilitate separation of these two effects by utilizing two different types of propagation, typically implemented using two different excitation frequencies, to separate the effects of signal delay due to increased length and signal delay due to lower velocity as a result of temperature changes. In this regard, multi-shape propagation as described herein is based on the tendency of a propagating stress wave to travel along different paths as a function of frequency. It has been found, for example, that at low frequencies, ultrasonic stress waves generally travel linearly and directly down a fiber or wire, while at higher frequencies, the waves bounce from one surface to the opposite surface in a manner analogous to the internal reflection inside of an optical fiber. As such, at low frequencies, the characteristics of an ultrasonic stress wave are primarily driven by longitudinal parameters, and as the frequency increases the characteristics become more dominated by shear parameters.

It has been found, in particular, that shear and longitudinal waves traveling in a wire waveguide are affected differently by changing temperature, and the magnitude of these differences is greater than the differences due to applied strain. In addition, because the balance between the different types of propagation is a function of frequency; different frequencies may be used to excite the two different propagation methods. For example, at low frequencies the L01 mode propagates primarily as a longitudinal wave, but at higher and higher frequencies the L01 mode becomes more like a shear wave.

As the frequency changes, for a given mode of propagation, the relative fraction of longitudinal and shear components changes. This relative fraction is referred to in this document as multi-shape, multi-type or different types of propagation depending upon context.

Therefore, by exciting with more than one frequency both longitudinal and shear waves may be propagated through the waveguide, and these multiple different shapes of propagation may then be used to separate the effects of temperature from strain, and thus compensate one measurement for the effects of the other. As such, for example, in some embodiments temperature compensation may be implemented in an ultrasonic sensor that measures force, pressure, acceleration, etc. using strain without the need for a second temperature compensation waveguide.

Figure 5:
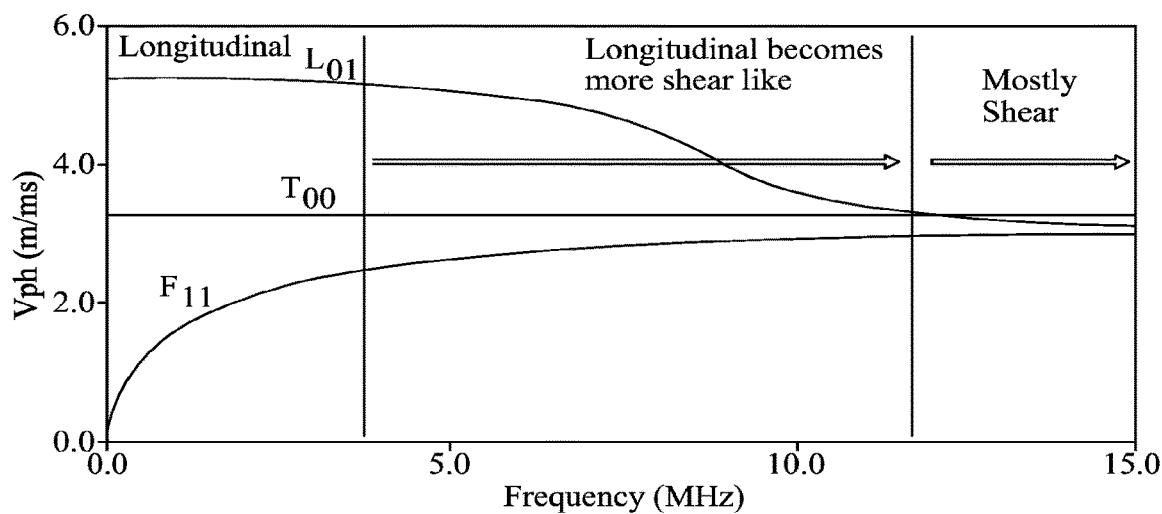
FIG. 5 is a graph illustrating velocity dependence as a function of frequency for three guided modes, longitudinal, torsional, and flexural.

It has been found, for example, that the ultrasonic velocities in elastic materials decrease with temperature, with a different velocity temperature gradient for the longitudinal and shear waves. For example, for mild steel the temperature coefficient of the longitudinal velocity is $dv_l/dT = 8.8 \cdot 10^{-4}$ mm/μs/° C. and for shear velocity it is $dv_s/dT = -7.1 \cdot 10^{-4}$ mm/μs/° C. The guided wave propagation in a wire is a combination of the longitudinal and shear waves reflected from the wire surface. The structure of the guided waves (relative contribution of the longitudinal and shear waves) changes with frequency and the guided waves are dispersive (as the velocity is a function of frequency). The velocity dependence as a function of frequency for the three guided modes, the longitudinal $L_{01}$, torsional $T_{00}$, and flexural $F_{11}$ are presented in FIG. 5. At low frequencies the displacement in the longitudinal guided wave $L_{01}$ is parallel to the wire axis (or propagation direction). However, at higher frequencies the guided longitudinal wave transforms mostly to the shear wave (or more exactly, to a Rayleigh wave). On the other hand, the displacement in non-dispersive torsional $T_{00}$ is perpendicular to the direction of propagation and the velocity of torsional wave is equal to the shear velocity $v_s$.

Figure 6:
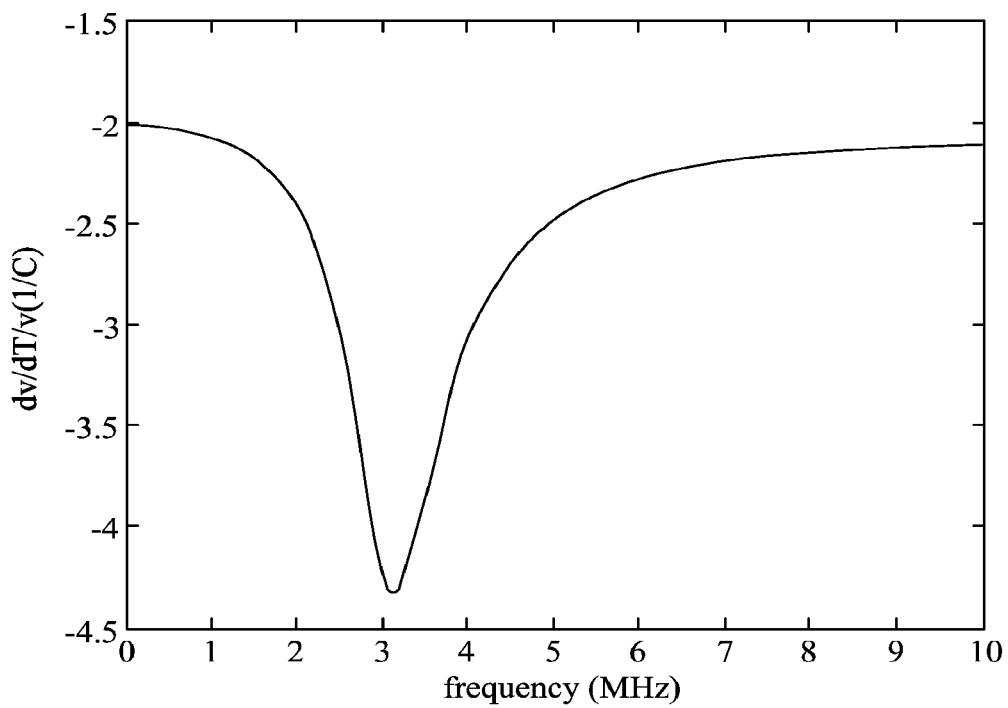
FIG. 6 is graph of uncompensated and thermal-expansion compensated velocity temperature gradients of a longitudinal guided wave versus frequency.

Thus, if the guided wave velocity depends on frequency its temperature gradient dv/dT will depend on frequency as well because the two different frequencies have different modal contribution. A separate reason for the temperature dependence of the guided wave velocity is thermal expansion. The wire thickness grows with temperature and for higher temperatures the guided wave propagates in effectively thicker wire, causing additional dispersion. FIG. 6 illustrates numerical calculations for the velocity temperature gradient of the longitudinal guided wave $L_{01}$ versus frequency.

The curves are flat at low and high frequencies where the guided wave is non-dispersive and reach a sharp minimum at frequencies which depend on the wire thickness.

To confirm the obtained numerical result an analytical solution may be calculated at low and high frequencies. The low frequency limit substantially coincides with the thin rod velocity temperature gradient ($v_r=\sqrt{E/\rho}$, where E is the Young's modulus and $\rho$ is the wire density) and the high frequency limit is substantially equal to the Rayleigh wave temperature gradient.

A waveguide sensor may be used to measure stress-induced changes in the waveguide length, and the temperature dependence of the guided wave velocity and the thermal expansion of the waveguide have been found to cause errors in this measurement. To illustrate this effect, one may consider a guided wave propagating in a wire of length l with velocity v at temperature T. The arrival time of the wave is equal to t=l/v. At a different temperature T+$\Delta$T, both the wire length and the guided wave velocity are changed, to l+$\Delta$l and v+$\Delta$v, respectively. These physical changes result in an altered arrival time, t+$\Delta$t=(l+$\Delta$l)/(v+$\Delta$v)$\approx$l/v(1+$\Delta$l/l−$\Delta$v/v)=(1+$\Delta$l/l−$\Delta$v/v). The relative change in arrival time is $\Delta$t/t=$\Delta$l/l−$\Delta$v/v. The relative wire length change due to temperature is $\Delta$l/l=$\alpha\Delta$T, where $\alpha$ is the linear thermal expansion coefficient (for steel $\alpha$=1.2·1.0$^{⊕5}$ 1/° C.). The relative velocity change is also proportional to temperature change, $\Delta$v/v=$\beta\Delta$T, where the relative velocity temperature gradient $\beta$=$v_{-1}\Delta$v/$\Delta$T (which is usually around $10^{-4}$ for steel). So, the relative arrival time change because of temperature is:

$$\frac{\Delta t}{t} = (\alpha - \beta)\Delta T \quad (1)$$

The thermal expansion and decrease in velocity with temperature are additive effects ($\alpha$ is typically positive and $\beta$ is typically negative); with increasing temperature the guided wave propagates over a longer distance with a lower velocity. As stated earlier, for steel $\beta$~$10^{-4}$, which will cause a change that may be an order of magnitude greater than thermal expansion. The change in wire length due to temperature can be comparable with the actual quantity of interest, the change in wire length due to mechanical strain. Since the temperature dependence of velocity can be much larger than either of length-change effects, it is often desirable to compensate for the effects of temperature in order to obtain an accurate measurement of the strain caused by mechanical stress.

It should also be noted that not only can the temperature be compensated, but it can also be directly measured without any additional hardware.

Modeling of Feedback Frequency for Different Temperatures and Stresses

In order to separate velocity-induced timing changes (which are due to temperature) from strain-induced timing changes, the differences in temperature dependencies of different vibrational types may be used, with an assumption made that strain will make an apparent shift at both frequencies proportional to the strain coefficient, and the temperature will make a change due to the temperature based coefficient.

One may consider a simple feedback model where change of resonant frequency is determined only by temperature and stress in a wire. In order to develop the model, one may consider a waveguide at temperature, T, and zero stress. The phase of a propagating wave in the wire is $\varphi$=kl=2$\pi$fl/v, where k is the wavenumber, l is the initial wire length, f is the feedback frequency and v is the phase velocity. For another external condition (temperature T+$\Delta$T and nonzero stress) the wire length changes to +$\Delta l_T$+$\Delta l_s$, where $\Delta l_T$ is the length change due to temperature and $\Delta l_s$ is the change due to applied stress, and the changed phase velocity is v+$\Delta$v. As a result the feedback frequency changes to an unknown value of f+$\Delta$f. The frequency shift can be found by observing that the wave's phase, which should be the same (as one may assume here that all changes in feedback frequency are due to changes in the wire); or:

$$\frac{(f+\Delta f)(l+\Delta l_T + \Delta l_s)}{v + \Delta v} = \frac{fl}{v} \quad (2)$$

Solving this equation for the relative frequency shift yields:

$$\frac{\Delta f}{f} = \frac{\Delta v}{v} - \frac{\Delta l_T}{l} - \frac{\Delta l_s}{l} = (\beta - \alpha)\Delta T - \varepsilon \quad (3)$$

The coefficients $\alpha$ and $\beta$ were introduced previously and parameter $\varepsilon$=$\Delta l_s$/l is the strain in the wire due to applied stress. Equation (3) shows that the shift of the feedback frequency depends on all three parameters: the guided wave velocity, the wire length change due to temperature, and the wire length change due to applied stress. For example $\beta$−$\alpha$$\approx$−2·$10^{-4}$1/C° for a steel wire at low frequency. So, the resonant frequency shift due to a temperature change of $\Delta$T=1° C. is comparable with the frequency shift due to wire strain ∈$\approx$2·$10^{-4}$. For a single frequency feedback measurement the effect of stress typically cannot be separated from the effect of temperature and a more sophisticated separation technique is required.

Using Two Feedback Frequencies for Temperature Compensation

It was shown in FIG. 6 that a guided wave velocity temperature gradient depends on frequency. However, the thermal expansion coefficient and the strain are non-dispersive. If two different frequencies $f_1$ and $f_2$ are excited in the system then their relative shifts due to temperature and stress may be determined as:

$$\frac{\Delta f_1}{f_1} = (\beta_1 - \alpha)\Delta T - \varepsilon \quad (4)$$

$$\frac{\Delta f_2}{f_2} = (\beta_2 - \alpha)\Delta T - \varepsilon \quad (5)$$

where $\beta_{1,2}$ are the relative velocity temperature gradients at frequencies $f_1$ and $f_2$, respectively, and $\beta_1 \neq \beta_2$ due to the velocity dispersion in the wire. The dependence on temperature can be removed from the above system of equations and we can calculate the strain as:

$$\varepsilon = \frac{\beta_1 - \alpha}{\beta_2 - \beta_1}\left(\frac{\Delta f_2}{f_2} - \frac{\Delta f_1}{f_1}\right) - \frac{\Delta f_1}{f_1} \quad (6)$$

or, in terms of phase change:

$$\varepsilon = \frac{\beta_1 - \alpha}{\beta_2 - \beta_1}(\theta_2 - \theta_1) - \theta_1 \quad (7)$$

As a result, simultaneous measurement of two different resonant frequencies in the stressed wire with changing temperature allows one to compensate for temperature effect by separating it from the mechanical stress effect. The coefficient $\delta=(\beta_2-\alpha)/(\beta_2-\beta_1)$ may be estimated from the curve in FIG. 6, but it may also be readily measured. The resulting temperature can also be independently solved.

Figure 7:
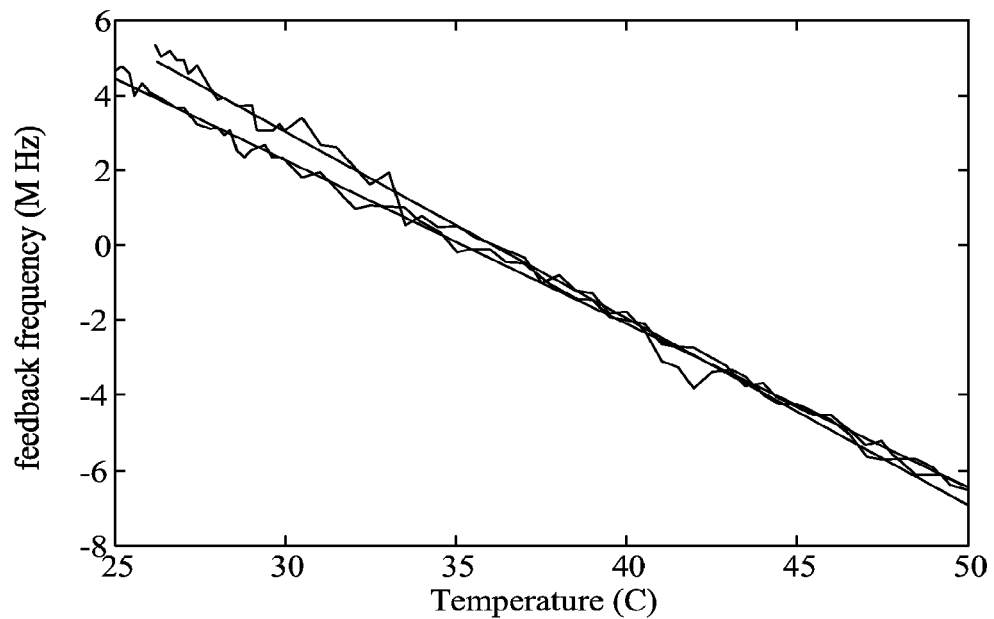
FIG. 7 is a graph of example excitation results at two different frequencies as a function of temperature.

In one embodiment, a change in feedback frequency was measured using two separate oven heating tests. One test used a 1 MHz transducer and the second test used a 5 MHz transducer. For each of the measurements the feedback frequency and how the feedback frequency changed as a function of temperature was recorded. The results are shown in FIG. 7; note that there is a slight difference between the two slopes due to the effect of the different types of propagation. As described above, one can use this difference in the slopes to separate out the effect due to temperature from the effect due to mechanical strain.

Theoretical Analysis of System Response to Temperature

It is also possible to create a resonance feedback based approach using a single transducer as both the receiver and transmitter in a pitch catch based configuration.

There is little by way of available data related to ultrasonic velocities' dependence on temperature. Temperature dependencies of the elastic constants for some pure crystals have been presented in *Numerical Data and Functional Relationships in Science and Technology* edited by K.-H. Hellwege et al., Springer-Verlag Publisher (1966). The data for pure crystals may be used in some embodiments to calculate the temperature dependence of the ultrasonic velocity, and assuming an example waveguide constructed of polycrystalline steel.

Note that both the elastic stiffnesses and the ultrasonic velocities drop with temperature. The response after 300 Kelvin is expected to be linear. The longitudinal and shear velocities in polycrystalline material with cubic symmetry and random grain distributions may be calculated as (by Voigt averaging):

$$\rho V_l^2 = \frac{1}{5}(3C_{11} + 2C_{12} + 4C_{44}) \quad (8)$$

and $$\rho V_s^2 = \frac{1}{5}(C_{11} - C_{12} + 3C_{44}) \quad (9)$$

where $V_l, V_s$ are the average longitudinal and shear velocities in cubic polycrystalline, $\rho$ is the density and $C_{11}, C_{12}, C_{44}$ are three elastic constants for cubic symmetry crystal.

Using equations (8) and (9) and the linear thermal expansion coefficient for steel $\alpha=1.2\cdot 10^{-5}$ 1/C° the temperature gradients $\beta_{l,s}$, of the longitudinal and shear velocities can be calculated:

$$\beta_l = \frac{1}{V_l}\frac{dV_l}{dT} \approx -0.5\cdot 10^{-4}\frac{1}{C^0}; \quad \beta_s = \frac{1}{V_s}\frac{dV_s}{dT} \approx -0.88\cdot 10^{-4}\frac{1}{C^0}; \quad (10)$$

Comparison of these coefficients shows that the velocity dependence on temperature plays a more important role than the thermal expansion coefficient. For example, for longitudinal wave propagation, 81% of changes due to temperature may be from the velocity temperature dependence and 19% from thermal expansion. For the shear wave propagation this ratio is 88% and 12%. For a guided wave (which is composed of both longitudinal and shear waves) this ratio is between these two values depending on type of the guided wave. Estimations show that a 1° C. temperature change is equivalent to the strain change $10^{-4}$ in wire for the shear wave propagation and $0.6\cdot 10^{-4}$ for the longitudinal wave propagation.

As such, it has been found that velocity change in a waveguide due to temperature can be mitigated by measuring the relative change in velocity of two different propagation types, e.g., by exciting two or more different types of propagation using two different frequencies.

Figure 8:
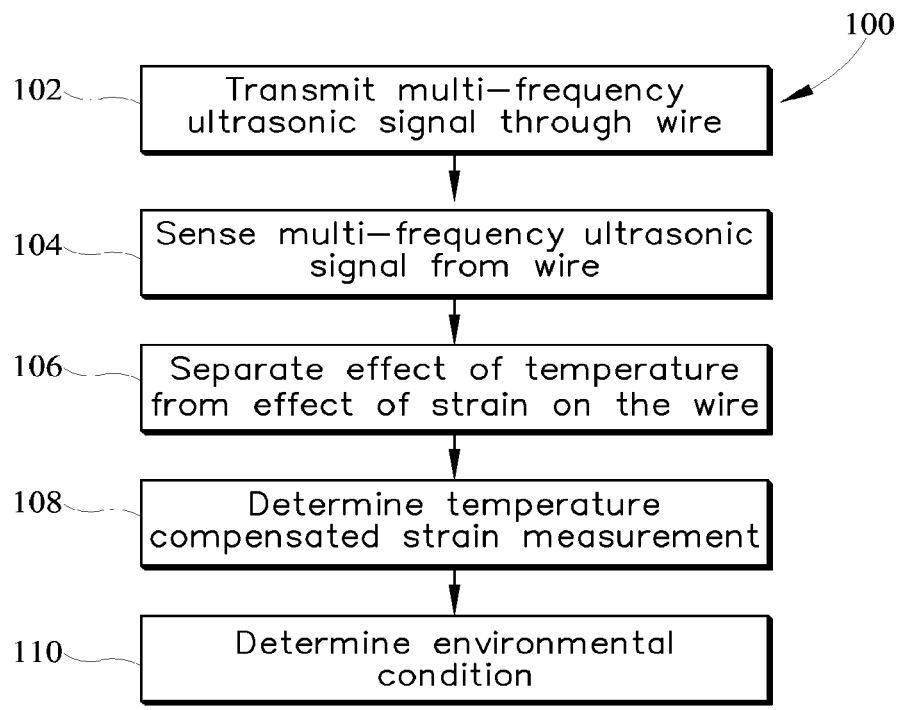
FIG. 8 is a flowchart illustrating an example sequence of operations for measuring an environmental condition using multi-shape propagation consistent with the invention.

FIG. 8 illustrates at 100 an example sequence of operations for measuring an environmental condition using multi-shape propagation, e.g., using a sensor such as sensor 10 of FIG. 1. First, a multi-shape ultrasonic signal is generated and transmitted through a waveguide wire (block 102), e.g., with using two or more excitation frequencies that impart multiple types of propagation of the ultrasonic energy through the wire. Next, the ultrasonic energy is sensed in block 104, and in blocks 106 and 108, the effects of temperature and strain are separated a and a temperature compensated strain measurement is determined, e.g., in the manner described above in connection with Equations (6) and (7). Then, from the temperature compensated strain measurement, an environmental condition (e.g., force, pressure, etc.) may be determined, e.g., in a manner that would be apparent to one of ordinary skill in the art having the benefit of the instant disclosure.

Resonance-Based Strain Measurements in a Waveguide Sensor

It has been found that measuring the length of a wire using ultrasound can be accomplished by measuring the time shift from two reflections within the wire in a pulse echo mode. It has further been found that this approach works well, but may have limited resolution in some applications. Embodiments consistent with the invention may improve on this resolution in some applications by establishing resonant oscillations in a waveguide wire through the application of positive feedback, which as discussed in greater detail below may be used to accurately measure the relative length and/or strain of the wire.

Embodiments consistent with the invention may establish resonant oscillations in a waveguide wire in a similar manner to how audio feedback occurs in an audio system (also known as the Larsen effect). Audio feedback occurs, for example, in an audio amplification system when the audio signal output by an audio output such as a speaker is picked up by an audio input such as a microphone, creating a positive feedback loop that further amplifies the audio signal. The audio feedback has been found to have a natural resonant frequency that is dependent upon the resonant frequencies of the components in the audio system as well as other environmental and system factors.

Similarly, it has been found that by establishing a positive feedback loop in a waveguide sensor, the resonant frequency of the ultrasonic energy propagated through the waveguide sensor will vary as a function of strain, and thus strain and related environmental conditions (e.g., force, acceleration, pressure, temperature, etc.) may be determined based upon a sensed resonant frequency of the ultrasonic energy in a waveguide sensor.

It has been found that in some applications, making direct strain measurements by determining the change in length of a waveguide wire via the phase difference between the sent and received signal is somewhat limited in that the approach requires the geometry of the waveguide and appropriate components to operate at a flat part of the dispersion curve.

If the system is operated at other frequencies distortion of the signal may occur, making phase measurements more difficult. In some embodiments consistent with the invention, on the other hand, the natural resonance of a waveguide system may be used to make strain measurements.

Figure 9:
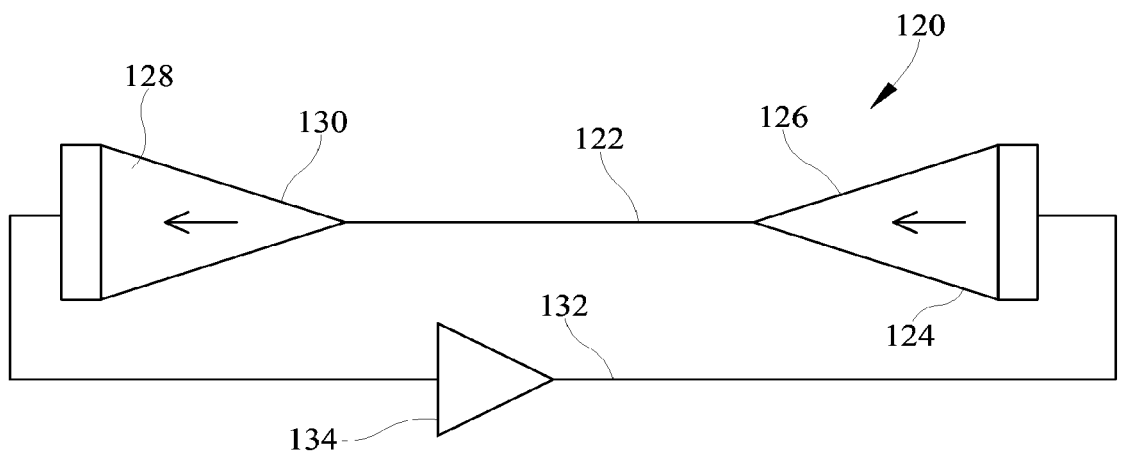
FIG. 9 is a block diagram of an example resonance-based waveguide system consistent with embodiments of the invention.

An example configuration of this type is illustrated by waveguide system 120 of FIG. 9, which includes a waveguide wire 122, or measurement waveguide, that is coupled to a transmitter 124 via a cone 126 or other suitable transformer to receive ultrasonic energy propagated at one or more excitation frequencies, as well as to a receiver 128 via a cone 130 that receives the propagated ultrasonic energy. A positive feedback loop 132 including an amplifier 134 is coupled between receiver 128 and transmitter 124, which creates positive feedback at one or more resonant frequencies. When wire 122 is subjected to strain, the length changes slightly, causing the natural resonant frequency to change slightly. Thus, by accurately monitoring frequency one can deduce the strain in the measurement waveguide. While not illustrated in FIG. 9, it will be appreciated that various sensor designs may be utilized to induce strain in the wire based upon the desired environmental condition to be measured (e.g., a diaphragm for pressure or force measurements). Moreover, a positive feedback loop may also be established in pulse echo embodiments where the transmitter and receiver are coupled to the same end of a waveguide wire.

In one embodiment, normal electronic noise from amplifier 134 creates an initial excitation, which is fed throughout the system and amplified by the receiving amplifier. The received signal is then fed back into the transmitter and positive feedback occurs. If amplification is higher than the total losses in the system, the output signal will grow with each cycle until specific frequencies are excited. In some embodiments, the overall signal level will be limited by the maximum voltage the amplifier can produce (its saturation limit), which may eliminate the need for any automatic gain control (AGC). In other embodiments, however, AGC or another control algorithm may be used to control the positive feedback in the waveguide system.

In one embodiment, the resonance is actively driven by a feedback control system. A tone is created near the expected resonance and is varied slightly, the control system tracks the maximum response by actively driving the system at its resonance. Changes in the frequency are proportional to the measurement of interest.

In the embodiment of FIG. 9, the signal produced is composed of several harmonic waves whose frequencies correspond to intervals where the system loses are minimal or, in other words, where the frequency response function (FRF) is maximized. This effect is known as the Acoustic Larsen Effect. The resonant frequencies of the acoustic feedback are believed to be extremely sensitive to any changes in the system (e.g., applied stress or temperature change) and the magnitude of frequency shift is related to strain in the wire (i.e., the relative change of the wire length) or the change in velocity due to temperature changes. The condition produces harmonic waves, $\exp\{i\omega t\}$, ($\omega$ is the angular frequency, and t is time) given by:

$$H(\omega)g = 1 \quad (11)$$

where $H(\omega)$ is the frequency response function (FRF) of the system and g is the amplifier gain. Frequencies that are the highest in the FRF will require the least amount of gain before condition (11) is satisfied, such that the condition is satisfied first for the frequencies near local maxima of FRF. In general the FRF is a complex function (having both magnitude and phase), and thus the resonances that are excited when using positive feedback correspond to the zero phase frequencies of the FRF. When the wire is strained the transfer function of the system changes, causing the resonant frequency of the feedback system to change.

Figure 10:
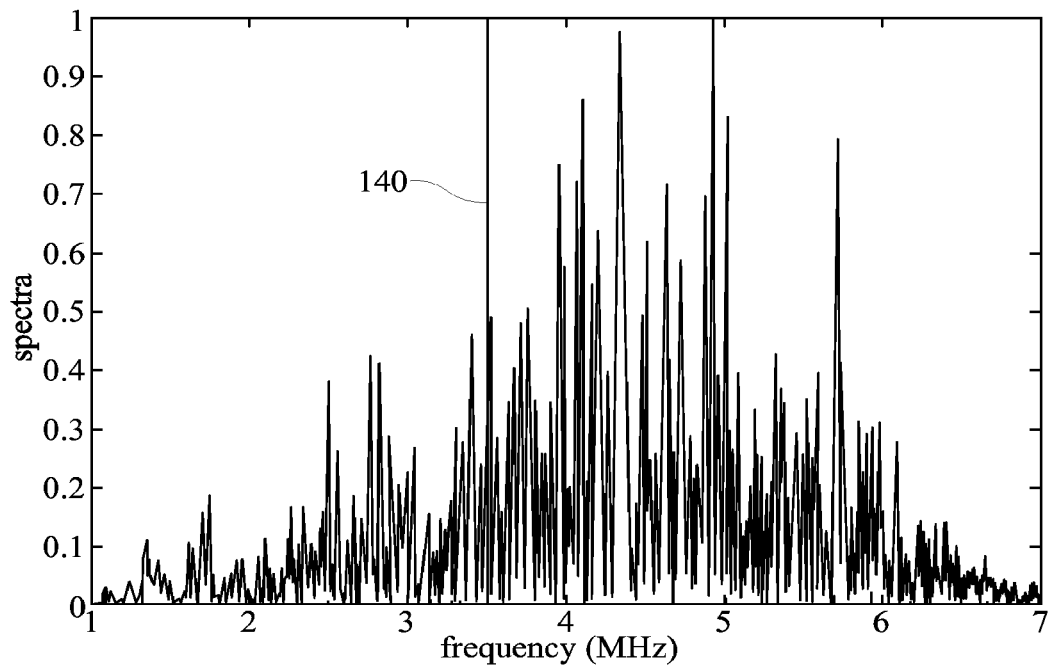
FIG. 10 is a graph illustrating a Frequency Response Function (FRF) and feedback spectrum for a waveguide system employing positive feedback.

FIG. 10 illustrates, for example, the magnitude of the FRF of an example system obtained using a pitch-catch technique and using 5 MHz transducers. The sharp peaks in the response are the resonances of the system. For example the feedback excitation frequency f=3.516 MHz (labeled 140) coincides with one of the local maxima of the FRF where condition (11) is satisfied (it has high amplitude and the correct phase for positive feedback).

Figure 11:
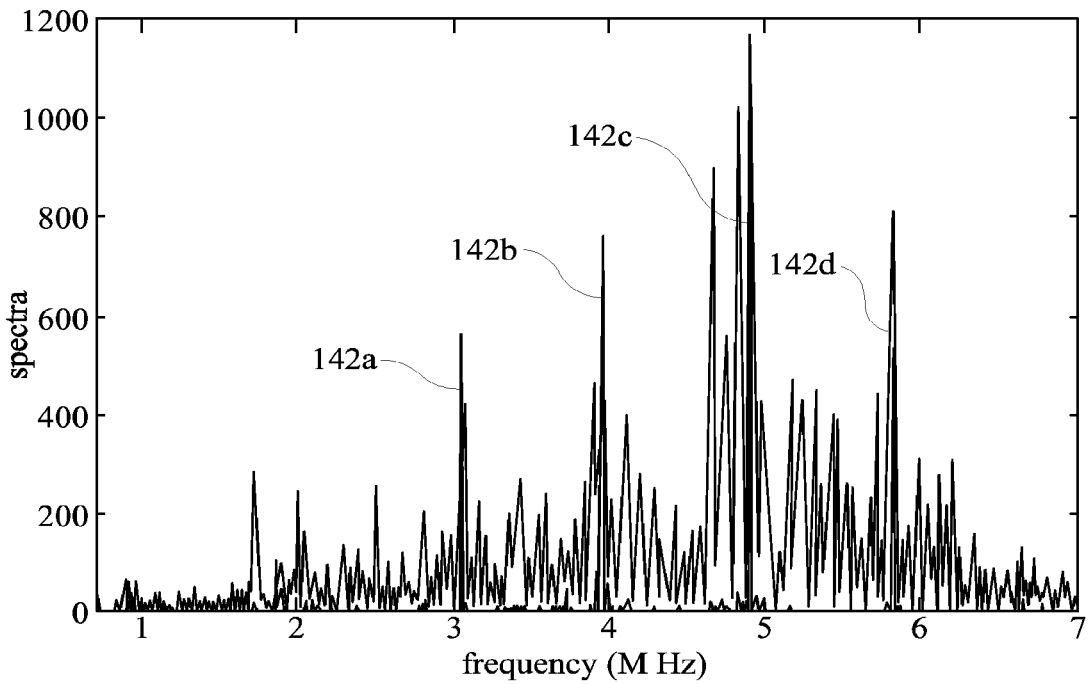
FIG. 11 is a graph illustrating a FRF and feedback spectrum for the same waveguide system used for the graph of FIG. 10, but at a higher amplifier gain.

As the feedback amplification is increased several harmonics may be excited at the same time. FIG. 11 for example illustrates the FRF and feedback spectrum for higher amplifier gain. The feedback condition, shown in equation (11) (both the amplitude and phase is such that the system naturally resonates), is satisfied now for several harmonic waves propagating in the waveguide with the frequencies f=3.05; 3.96; 4.91 and 5.83 MHz (labeled at 142a-d), and it has been found that any of these frequencies can be used for detection of strain in the measurement waveguide.

A direct relationship exists between the frequency shift and the strain in the material. One can typically assume that the only change in the system with strain applied is due to increasing the wire length. For a traveling wave the wavenumber is defined as $$k = \frac{2\pi}{\lambda} = \frac{2\pi f}{v},$$

where $\lambda$ is the wavelength in the material, f is the frequency, and v is the velocity of the wave. For the feedback harmonic wave in the wire, the signal has some phase kl, where l is the wire length and k is the wavenumber of propagation wave. Due to an applied force the wire will lengthen to the new length l+dl, with the corresponding wavenumber k+dk. Due to the system constraints the phase of the wave in a feedback system must stay the same, or mathematically (k+dk)(l+dl)=kl. Solving this equation for the strain $\epsilon$=dl/l (assuming a small displacement dl in the linear range) strain may be calculated as:

$$\epsilon = \frac{dl}{l} = -\frac{dk}{k} = -\frac{df}{f} \quad (12)$$

where df/f is the relative frequency shift in the feedback. Thus, one can estimate the strain in the wire with the same accuracy that one can measure the frequency before and after the applied stress.

Figure 12:
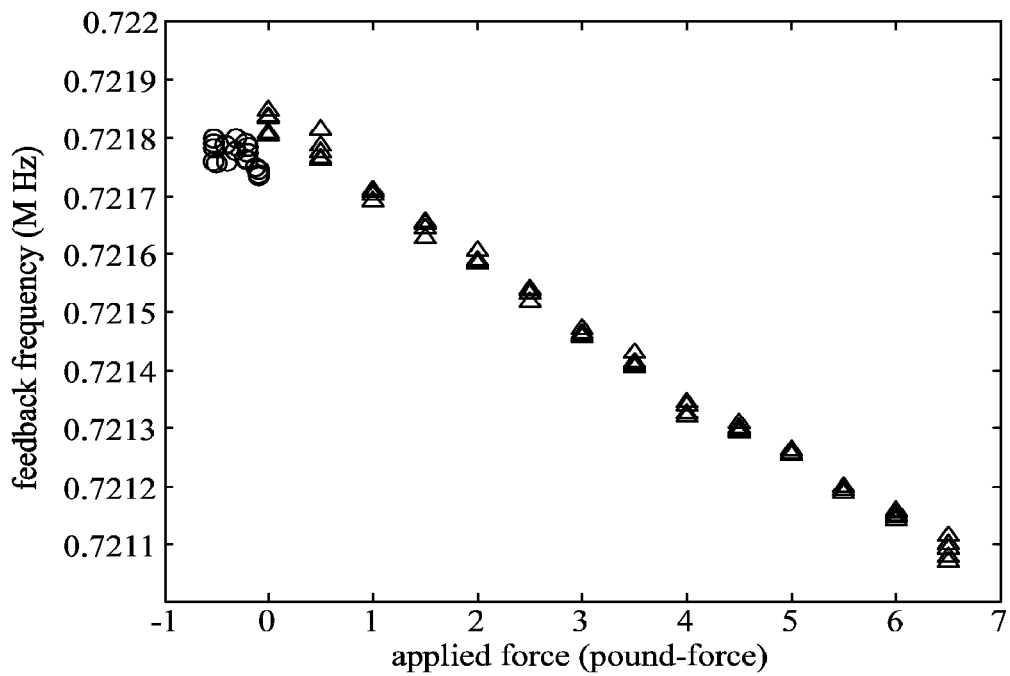
FIG. 12 is a graph of shift in resonant frequency versus applied force using an experimental setup.

In one experimental setup, one side of a waveguide wire was fixed and another side was allowed to slide due to the applied force. The reference force was measured by an s-shaped load cell and the displacement (i.e. the wire extension) was measured by a digital micrometer. The harmonic feedback signals were acquired by a Lecroy digital oscilloscope and recorded for offline signal processing. Every signal (one million samples length) was Fourier transformed to the frequency domain and the frequency (with linear interpolation) was determined to an accuracy of more than $10^{-7}$ Hz. FIG. 12 illustrates the shift in the feedback frequency versus applied force in the range from 0 to 6.5 pound-force for comparison with Hooks law. Two 1 MHz transducers were used to excite and receive ultrasonic wave. For each value of the force the frequency was measured five times to estimate its fluctuation for the same strain. A clear trend in frequency from 0.7218 MHz to 0.7211 MHz was observed. The dependence between applied force and frequency shift, as expected, was linear. After the test was run, the system was released back to zero force and the feedback frequency returned to its original value. In order to show that the frequency shift was not affected by the orientation and shape of the wire, for the unstrained cases, the wire was moved such that it formed an arc. The results from the unstrained "arced" case are also shown in FIG. 12, denoted at 144. This result shows that the feedback frequency depends only on the strain in the wire, not the shape of the wire at zero strain.

Figure 13:
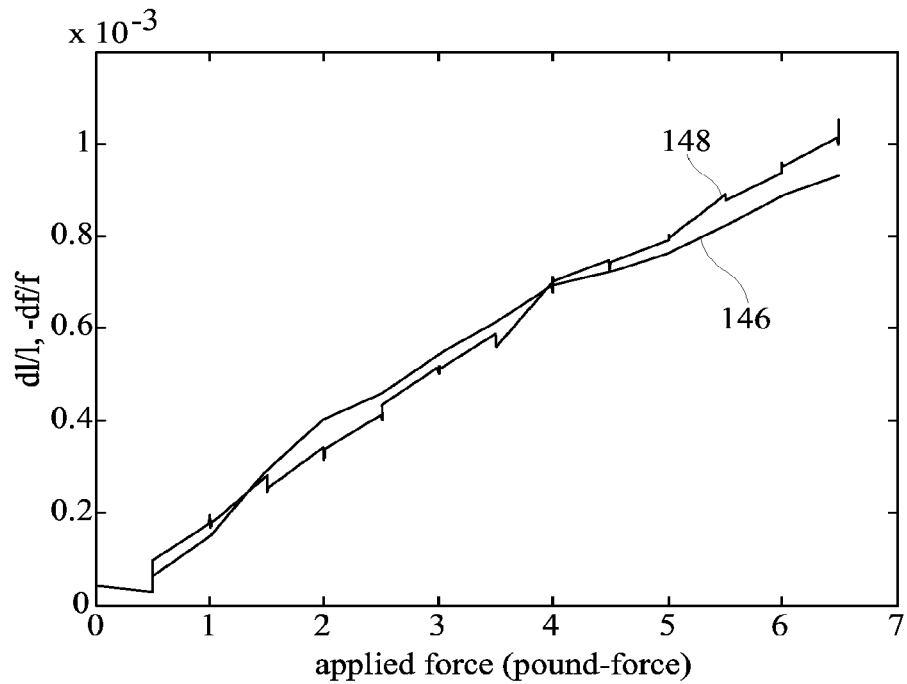
FIG. 13 is a graph of comparing measurements of strain in a waveguide wire based on micrometer data and shift in resonant frequency.

FIG. 13 presents the strain in the wire based on micrometer data and the relative change of feedback frequency −df/f along the y axis and the force as measured by the load cell along the x axis. The "theoretical" stress strain curves made using traditional sensors (shown at 146) closely match the results of the waveguide based strain measurement (shown at 148). Except for the high strain region ($\varepsilon 0.8 \ 10^{-3}$) these two curves are very close to each other showing that the strain in the wire can be determined from the waveguide sensor using feedback frequency shift.

Thus, by accurately measuring the change in the feedback frequency (induced by the Larsen effect) one can create an accurate measurement of the strain in a waveguide wire. By configuring the system in different ways this measurement can be used to measure mechanical strain, temperature and other physical quantities.

In addition, it will be appreciated that the resonant frequency of a waveguide system may be manipulated in order to generate resonance within a desired range of frequencies, e.g., through the use of electronic and/or physical filters, selection of components, manipulation of the excitation signal (e.g., via control over pulse widths, discussed below), etc. In addition, it will be appreciated that by establishing oscillations at multiple resonant frequencies, and in particular, multiple resonant frequencies that impart multiple types of propagation, the effects of temperature and strain may be separated in the manner disclosed above based upon the observed frequency shifts at different resonant frequencies.

Figure 14:
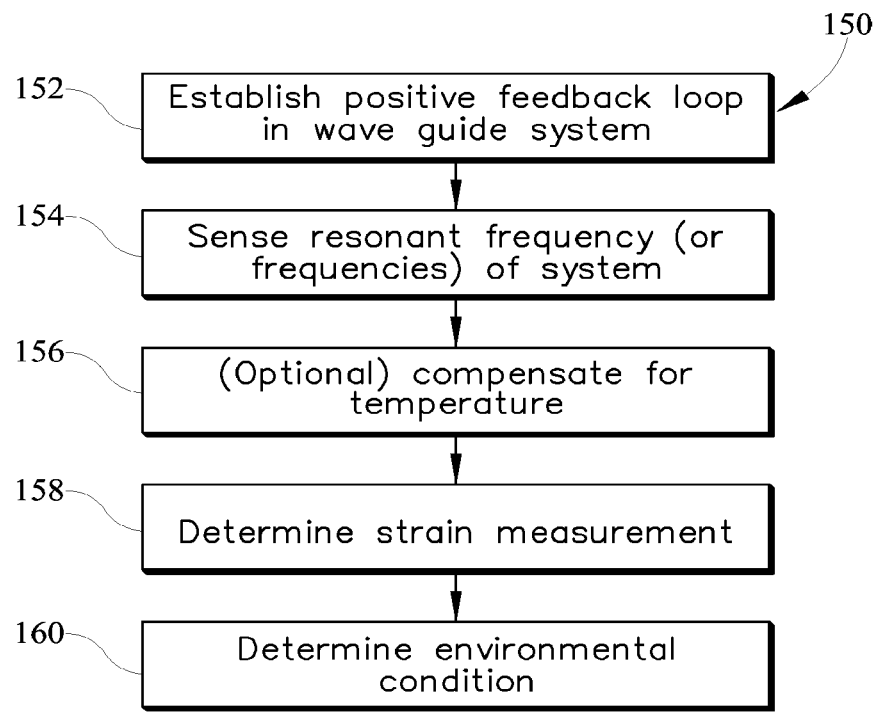
FIG. 14 is a flowchart illustrating an example sequence of operations for resonance-based measurement of an environmental condition using a positive feedback loop.

FIG. 14 illustrates at 150 an example sequence of operations for resonance-based measurement of an environmental condition, e.g., using a system such as illustrated in FIG. 9. First, a positive feedback loop is established (block 152), and in block 154, the resonant frequency (or multiple resonant frequencies) are sensed. Next, in block 156, temperature compensation may be performed (e.g., based upon multi-type propagation in the manner discussed above), and then a strain measurement is determined, e.g., in the manner described above in connection with Equation (13) (block 158). Then, from the strain measurement, an environmental condition (e.g., temperature, force, pressure, etc.) may be determined, e.g., in a manner that would be apparent to one of ordinary skill in the art having the benefit of the instant disclosure (block 160).

Multi-Frequency Excitation Using Variable Duty Cycle

As noted above, it may be desirable in some embodiments to excite a waveguide sensor using an ultrasonic signal incorporating multiple excitation frequencies. This can be accomplished by wave shaping, numerical calculation and digital conversion and other approaches. Different types of waveforms (such as sine, square, triangle, etc . . . ) have different frequency content, and it is believed that the use of a square or rectangle wave as the basis for the generation of different frequencies is attractive for some embodiments since it can be directly generated by a purely digital signal source, potentially eliminating the need for a complex and expensive digital to analog converter.

By changing the duty cycle of the square wave, the relative content of the different harmonics of the signal may be adjusted. Additional adjustments may be made by employing analog filtering of the resulting square wave, and this filtering may be accomplished explicitly (e.g. by an analog filter) or implicitly by having a transducer with limited, or the desired, frequency filtering characteristics designed into the transducer.

This approach allows multiple frequencies of excitation to be created without using complex digital signal processing or analog electronics. The signal may be generated directly from a digital source such as a microprocessor, as many microprocessors and Digital Signal Processors (DSPs) have built in facilities to generate digital signals with different duty cycles automatically, thereby enabling multiple frequencies to be generated with a minimum of additional hardware components. In addition, an amplifier that sits between the microprocessor and the transducer may not be required to be of high precision as the amplifier functions predominantly as a switching device. In addition, at lower frequencies, simple devices such as relays (both mechanical and solid state) may be used to provide the amplification.

This approach may be used, for example, to generate harmonics of the fundamental frequency of the square wave. For example if the fundamental frequency is 100 kHz, this approach may be used to generate content at 100 kHz, 200 kHz, 300 kHz, 400 kHz, etc. The use of harmonics is acceptable for some applications, such as the use of multiple modes of propagation to separate temperature effects in ultrasonic waveguides, discussed above.

As described above different waveforms have different frequency content. Consider a variable duty cycle square wave with the following definition:

$$V(t)=1, \ 0<t<Mt_p; \ V(t)=-1, \ Mt_p<t<t_p, \ 0<M<1 \tag{13}$$

Figure 15:
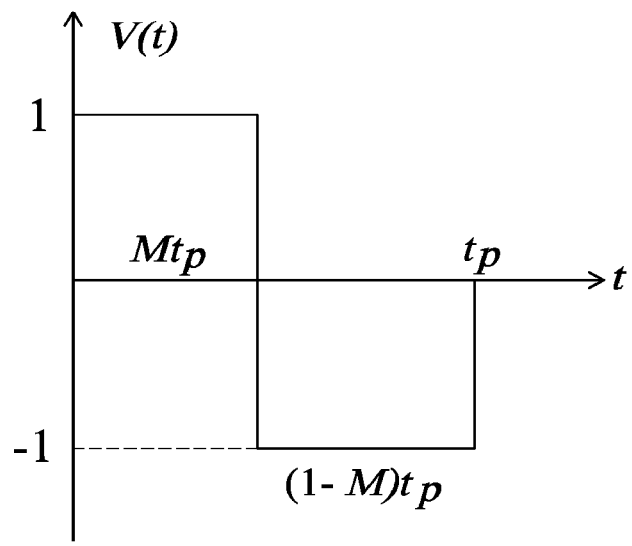
FIG. 15 is an illustration of an example rectangle wave.

The wave period is expressed as $t_p$ and the duty cycle is M. This waveform is shown in FIG. 15. The positive cycle of the square wave has duration $M \cdot t_p$ and its negative cycle duration is $(1-M) \cdot t_p$. The particular case of a pulse wave for $M=\frac{1}{2}$ is the square wave.

The Fourier series (the frequency spectrum) for a square wave with duty cycle M is:

$$V(t) = (2M - 1) + \frac{4}{\pi}\Sigma_{n=1}^{\infty} \frac{\sin(\pi M n)}{n} \cdot \cos(2\pi f n t - \pi M n) \tag{14}$$

where $f=1/t_p$ is the first harmonic frequency. The amplitude of nth harmonic is $A_n |\sin(\pi M n)|/n$ and its phase is $\varphi_n=-\pi M n$ if $\sin(\pi M n)>0$ or $\varphi_n=\pi-\pi M n$ if $\sin(\pi M n)<0$. This allows one to select the appropriate fundamental frequency and duty cycle to create the appropriate amplitude of different harmonics (within the confines of the above relationship) to suit the application.

Table I presents the amplitudes of several harmonics with different duty cycles, M, for a unit square wave:

TABLE 1

Square wave harmonics amplitudes for different values of M

| | $A_1$ | $A_2$ | $A_3$ | $A_4$ | $A_5$ |
|---|---|---|---|---|---|
| M = 1/4 | 0.900 | 0.637 | 0.300 | 0 | 0.180 |
| M = 1/3 | 1.103 | 0.551 | 0 | 0.276 | 0.220 |
| M = 1/2 | 1.273 | 0 | 0.424 | 0 | 0.255 |
| M = 2/3 | 1.103 | 0.551 | 0 | 0.276 | 0.220 |
| M = 3/4 | 0.900 | 0.637 | 0.300 | 0 | 0.180 |
| M = 4/5 | 0.749 | 0.606 | 0.404 | 0.187 | 0 |

If additional frequency shaping is desired, this may be implemented by adding a passive or active analog filter after the generation of the square wave. The frequency response of the transducer may also be used to shape the relative amplitudes of the different harmonics. In addition a combination of both an analog filter and the transducer's response may be used to shape the frequency spectrum.

This approach can be useful for some embodiments as an inexpensive and pragmatic way to create multiple frequencies of excitation in an ultrasonic waveguide. As was described above in connection with multi-type propagation, if two different frequencies are excited in an ultrasonic waveguide, they will respond slightly differently to temperature and stress effects. This small difference may be used to separate the effects of temperature from strain inside the waveguide.

Figure 16:
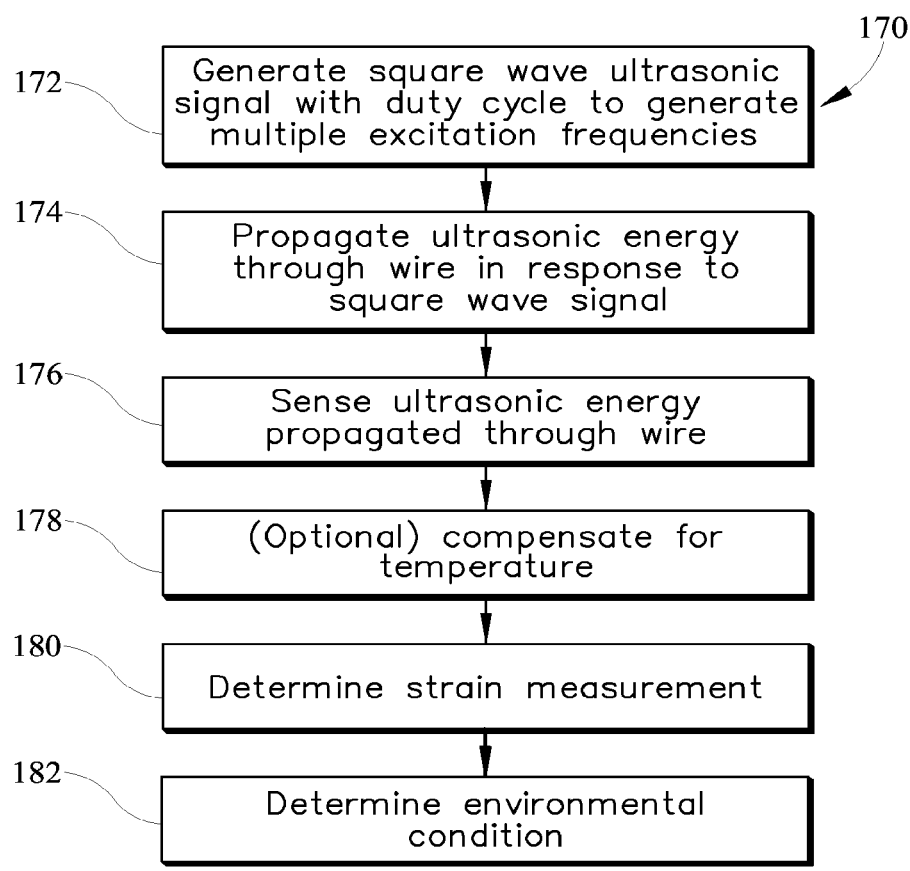
FIG. 16 is a flowchart illustrating an example sequence of operations for measurement of an environmental condition using multiple excitation frequencies generated via a rectangle wave with a controlled duty cycle.

FIG. 16 illustrates at 170 an example sequence of operations for multi-frequency excitation consistent with the invention, e.g., using a system such as illustrated in any of FIGS. 1-4. First, a square wave ultrasonic signal is generated having a duty cycle that is selected or calculated to generate the desired excitation frequencies (block 172), and in block 174, ultrasonic energy is propagated through the wire in response to the square wave signal to excite the wire at the multiple excitation frequencies based at least in part on the duty cycle of the square wave. Next, in block 176, the propagated ultrasonic energy is sensed, and in block 178, temperature compensation may be performed (e.g., based upon multi-type propagation in the manner discussed above), and then a strain measurement is determined in block 180. Then, from the strain measurement, an environmental condition (e.g., temperature, force, pressure, etc.) may be determined, e.g., in a manner that would be apparent to one of ordinary skill in the art having the benefit of the instant disclosure (block 182).

Phase Matched Cones for Excitation and/or Sensing of Ultrasonic Signals in a Waveguide Sensor Conical transformers may be used to couple ultrasonic energy between a waveguide wire and receiving and/or transmitting transducers. Conventionally, however, the efficiency of such conical transformers has not been optimal for many waveguide sensor applications. Embodiments consistent with the invention, on the other hand, utilize phase matched conical transformers, or phase matched cones, to improve the efficiency of communicating ultrasonic energy between a waveguide wire and a transducer. In particular, the geometry of a cone may be configured to optimize excitation of a waveguide wire by a transducer, as well as to optimize sensing of ultrasonic energy propagated through a waveguide wire by a transducer.

Phase matching is employed in other areas to optimally impart energy to a structure. For example, phase matching may be used to inspect planar structures with an ultrasonic wedge transducer. These transducers may be used to create guided waves that are able to perform inspections of large planar surfaces with a single measurement point. Such sensors typically use a material that has a lower speed of sound than the host material. This lower speed along with the carefully designed angle of the transducer causes all of the energy to arrive at the same "time", causing constructive interference at the interface.

Some embodiments of the invention may similarly employ a cone having a desired geometry, material and fabrication for use in ultrasonic sensing with desirable signal to noise ratios. In some embodiments, for example, acrylic phase matched cones have been found to be capable of imparting mechanical strain energy into a very fine waveguide with high efficiency.

In order to efficiently get ultrasonic energy into a thin waveguide wire a phase matched cone approach is used. Two basic designs for a phase matched cone are shown at 200 (coupling a wire 202 to a transducer 204) and 210 (coupling a wire 212 to a transducer 214) in FIGS. 17 and 18, respectively. In the small aperture angle case (FIG. 17), the signal propagates out of cone 200 to the right; in the large aperture angle case, the signal propagates out to the left, in a configuration referred to herein as a reverse cone configuration. Note that wire 212 projects through a hole in transducer 214 in FIG. 18.

It has been found that two material properties are important to the performance of a phase matched cone: the ultrasonic velocities in the material and the material attenuation. It is desirable, in particular, for the velocity of sound in a cone to be lower than the velocity of sound in a wire. Most plastic materials satisfy this requirement, and it is believed that the exact speed is not important as it only changes the optimal cone angle. The sound velocities and the ultrasonic attenuation are typically not listed for most materials; therefore it is often desirable for samples to be tested to determine these characteristics.

It is believed that a phase-matched cone is one of the most efficient geometries to transmit ultrasonic energy from a piezoelectric transducer to a cylindrical waveguide (wire), and optimal cone geometry depends primarily on the material properties of the cone and waveguide. If the waveguide is simply affixed to the end of the wire only the small overlapping wire-transducer contact area contributes to the guided wave excitation. This small contact area leads to very low efficiency of excitation because the rest of the transducer does not contribute any energy within the waveguide. The difference between direct and phase-matched cone designs is schematically presented in FIGS. 19 and 20, where in FIG. 19, a wire 220 is affixed to a transducer 222 at a small contact area 224, while in FIG. 20, a wire 230 is affixed to a transducer 232 through a cone 234 that provides a substantially larger contact area with transducer 232.

As noted above in connection with FIGS. 17 and 18, two designs of a phase-matched cone are considered. For the first design the guided wave propagates in the same direction as the incident wave from the transducer (FIG. 17); this design is termed the "small aperture angle". For the second design, the guided wave propagates in the opposite direction to the incident wave from the transducer (FIG. 18); this design is termed the "large aperture angle," or alternatively the reverse cone. It should be noted that for a cone half-aperture angle of $\theta=45°$ the wave reflected from the lateral cone surface propagates normally to the wire without any guided wave excitation. It is clear that for small aperture angle designs the standard contact transducer can be used but for large aperture angle design when the guided wave propagates in the backward direction a ring transducer typically must be used. Both designs have a number of tradeoffs, which will be analyzed in the following sections.

Small Aperture Angle (θ<45°) Phase Matched Cone

Figure 21:
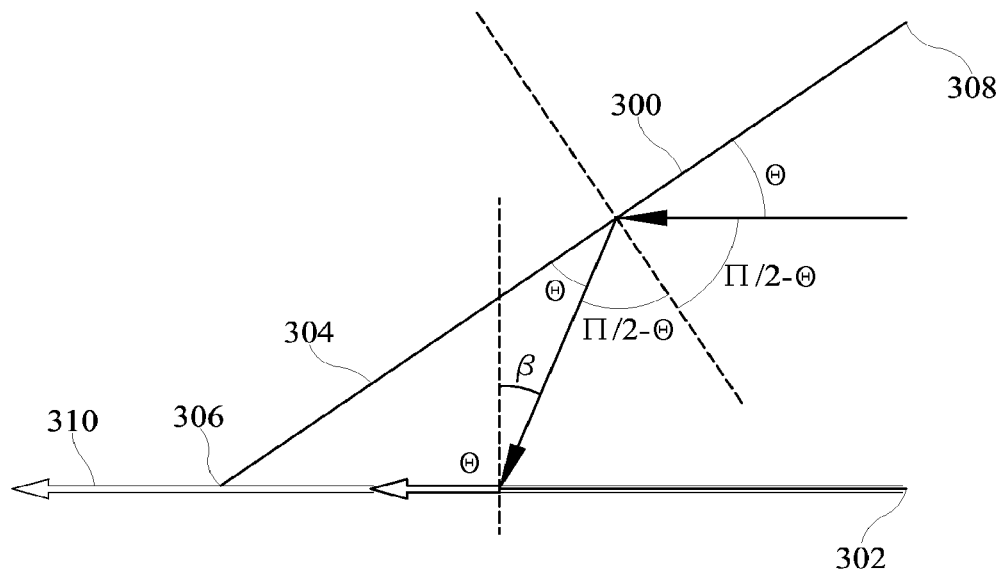
FIG. 21 is a cross-section illustration of a wave path in a small aperture angle cone.

FIG. 21 presents wave propagation inside a cone 300 and in a wire 302 for a half aperture angle θ<45°. Cone 300 includes a conical surface 304 extending between an apex 306 and a base 308 and including an axis 310 along which wire 302 is positioned. The longitudinal wave from a transducer propagates parallel to the wire and its incident angle on the lateral cone surface is π/2−θ. A portion of this wave reflects as longitudinal with the same angle. Another part of the wave transforms to a shear wave with the propagation angle defined by Snell's law. The shear wave does not make any contribution to the guided wave excitation and it is omitted from analysis.

The incident wave angle, β, on the wire surface can be calculated from the cone geometry and is equal to π/2−2θ. The incident wave is transformed to the guided wave in the wire with a velocity $V_w$, which is frequency dependent. Wave transformation on the cone-wire interface obeys the Snell's law:

$$\frac{\sin\beta}{V_c} = \frac{\sin(\pi/2 - 2\theta)}{V_c} = \frac{\cos 2\theta}{V_c} = \frac{1}{V_w} \tag{15}$$

where $V_c$ is the longitudinal velocity in the cone.

As a result the optimal half aperture angle depends on the velocities in the cone and in the wire and is presented as cos 2θ=$V_c/V_w$ or:

$$\theta = \frac{1}{2}\arccos\left(\frac{V_c}{V_w}\right) \tag{16}$$

For each material with different velocities the cone geometry will be different. The cone geometry also depends on the ratio of the cone's longitudinal velocity to the guided wave velocity in the wire. For example, for a Plexiglas cone and steel wire with the velocities $V_c$=2.70 mm/μs, $V_w$=5.23 mm/μs the half aperture angle is θ=arccos(2.70/5.23)/2=29.5°. For an Alumilite Replicator 495 ($V_c$=2.36 mm/μs) cone and the same steel wire the half aperture cone angle is θ=arccos(2.36/5.23)/2=31.6°.

Large Aperture Angle (θ>45°) Phase Matched Cone

Figure 22:
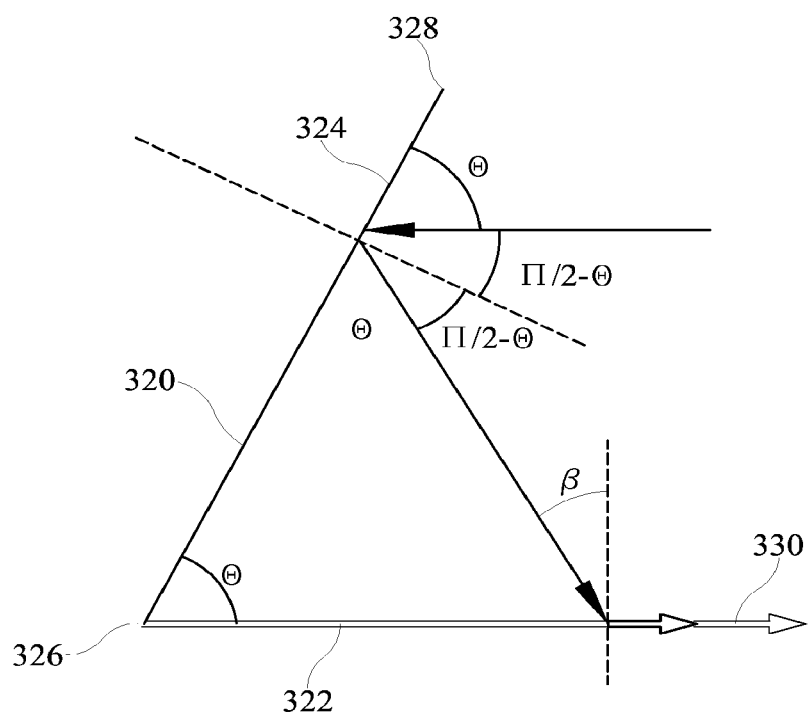
FIG. 22 is a cross-section illustration of a wave path in a large aperture angle cone.

Similar analysis to a small aperture angle may also be performed for a large aperture angle phase matched cone 320, e.g., as illustrated in FIG. 22. Cone 320 is coupled to a wire 322 and includes a conical surface 324 extending between an apex 326 and a base 328, along with an axis 330 along which wire 322 is positioned. In this case, the incident wave from a transducer returns back after reflecting on the cone's lateral surface and transforming on the cone-wire interface.

Calculating appropriate incident and reflected angles the optimal large aperture cone angle is:

$$\theta = \frac{1}{2}\arccos\left(-\frac{V_c}{V_w}\right) = \frac{\pi}{2} - \frac{1}{2}\arccos\left(\frac{V_c}{V_w}\right) \tag{17}$$

Thus, for a Plexiglas cone and steel wire with the velocities $V_c$=2.70 mm/μs, $V_w$=523 mm/μs the half aperture angle is θ=arccos(−2.70/5.23)/2=60.5°. For an Alumilite Replicator 495 ($V_c$=2.36 mm/μs) cone and the same steel wire the half aperture cone angle is θ=arccos(2.36/5.23)/2=58.4°.

As a result, an optimal angle for both the large and small aperture angle phase matched cones is believed to be predominantly, if not entirely, a function of the material properties of the cone and the wire. The guided wave velocity in both the wire and the cone, however, is frequency dependent, and as such the optimal design is typically different for different operating frequencies. The overall phase matched cone performance may also be driven by other factors as further described below.

Wave Transformation on the Cone Lateral Surface

Figure 23:
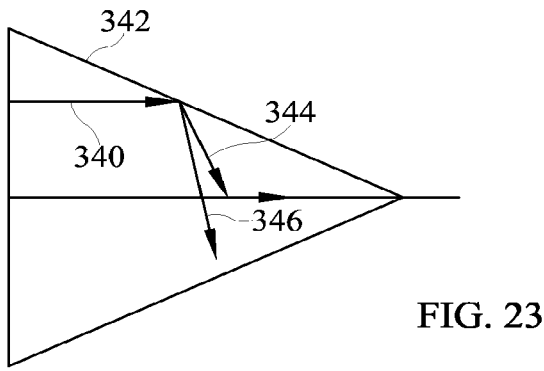
FIG. 23 is a cross-section illustration of the transformation of an incident longitudinal wave on a lateral cone surface to longitudinal and shear reflected waves.

When the incident longitudinal wave hits the edge of the phase matched cone, due to the way ultrasonic waves travel in solids some of the longitudinal wave is converted to a shear wave. The transformation is shown in FIG. 23, where an incident longitudinal wave 340 hitting the edge of a cone 342 splits into longitudinal 344 and shear 346 components. The existence and angle of the reflected shear wave is a function of the material properties of the cone, the material properties of surrounding medium (in most cases air), and the incident angle. The reflected shear wave does not significantly contribute to the energy in the wire and, depending upon the phase and direction it hits the wire, can cause a loss.

Figure 24:
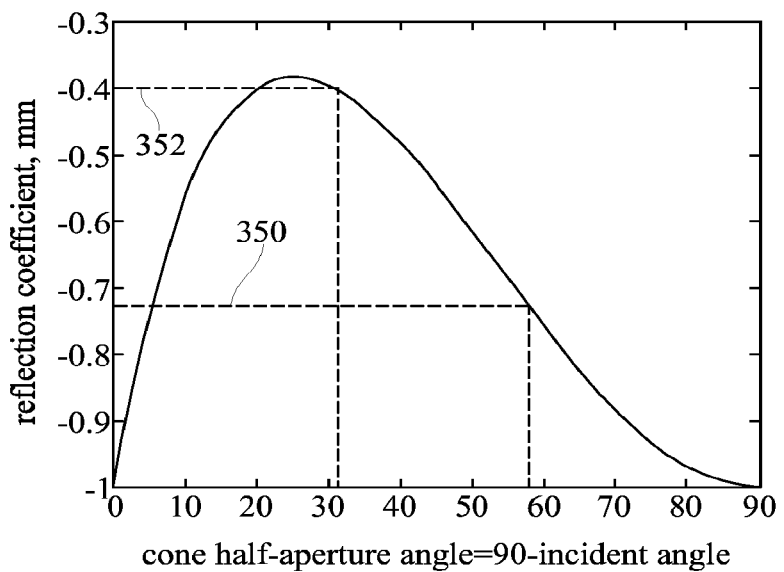
FIG. 24 is a graph of the longitudinal-to-longitudinal reflection coefficient for cone ($V_f$=2.36 mm/μs, $V_s$=1.18 mm/μs) versus a half-aperture angle.

The reflected shear wave propagates into the cone and is scattered on the wire. It does not substantially excite the guided wave in the wire because the phase-matched conditions are not satisfied, so this part of the reflected wave will typically be lost. In addition, the shear wave after several reflections within the cone may be transformed back to a longitudinal wave, which can propagate toward the transducer and create a parasitic signal. For this reason, increasing the longitudinal part of the reflected wave (and consequently decreasing the shear reflected wave) can improve the guided wave amplitude. The longitudinal-to-longitudinal reflection coefficient on the lateral cone surface (free surface) is presented in FIG. 24 for an Alumilite Replicator 495 cone ($V_l$=2.36 mm/μs, $V_s$=1.18 mm/μs) versus its half aperture angle θ. In should be noted that the incident angle on the lateral surface is $\theta_l$=π/2−θ and the reflection coefficient can be presented as:

$$R_{ll} = \frac{V_s\cos\theta_l\tan^2(2\gamma_s) - V_l\cos\gamma_s}{V_s\cos\theta_l\tan^2(2\gamma_s) + V_l\cos\gamma_s} \tag{18}$$

where $V_l, V_s$ are the longitudinal and shear velocities in the cone, and $\gamma_s$ is the shear wave reflected angle defined by the Snell's law as sin $\theta_l/V_l$=sin $\gamma_s/V_s$.

For all angles the reflection coefficient is negative (indicating a phase reversal on the free surface). Comparison of the small and large aperture angle shows that the large aperture angle reflects about 74% of the incident longitudinal wave (line 350), but the small aperture angle reflects only 41% of the incident longitudinal wave (line 352). This means that the large aperture angle is 80% more efficient than the small aperture angle for an Alumilite Replicator 495 phase matched cone. If one takes into account that the same cone will be used for both transmitting and receiving the desired signal, the total improvement to the system signal to noise ratio is the product of each cone's SNR improvement giving a total system improvement of $1.82^2$=3.3 times.

Attenuation Due to Losses in the Cone Material

Figure 25:
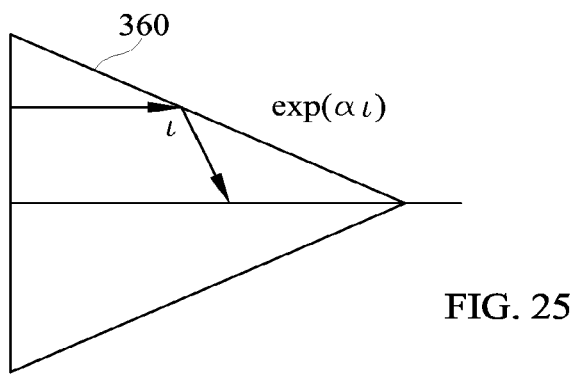
FIG. 25 is a cross-section illustration of decreasing amplitude due to attenuation in a cone.
Figure 26:
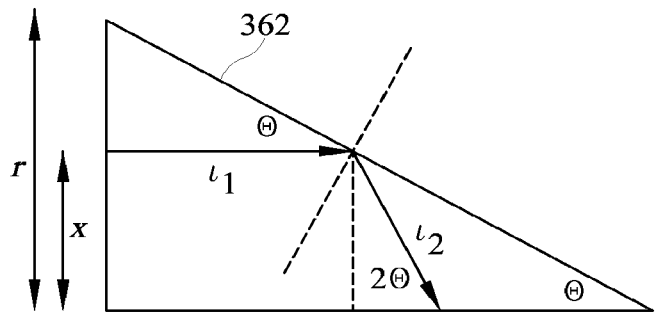
FIG. 26 is a cross-section illustration of wave propagation inside a small aperture cone.

Another effect on the guided wave amplitude is attenuation within the phase matched cone material; as the wave travels through the cone some of the signal is absorbed by the cone's material. The path length of the ultrasonic signal in an example cone 360 is shown in FIG. 25. The decrease in amplitude due to attenuation is exp(−αl), where α is the frequency dependent attenuation coefficient and l is the length of the wave path in cone. The attenuation coefficient should not be very high or it attenuates the signal that reaches the wire. At the same time, the attenuation should not be very low or the waves in the cone will reverberate causing additional non-phase matched energy to enter the waveguide, causing the signal to widen and, depending upon the phase, lower the signal level. For numerical characterization of attenuation losses one can introduce the cone with base radius r and the half aperture angle θ. The height of the cone is h=r/tan θ. The geometry is shown at 362 in FIG. 26. The propagation length l for each incident wave depends on its distance from the cone axis (wire) x.

After simple geometrical calculations the wave path versus A x may be written as:

$$l(x) = l_1 + l_2 = \frac{r-x}{\tan\theta} + \frac{x}{\sin 2\theta} \quad (19)$$

This path is maximal for the paraxial rays (x=0) with l(0)=r/tan θ and decreases for peripheral (edge) rays (x=r) with l(r)=r/sin 2θ. Their ratio depends only on the cone and wire velocities: (0)/l(r)=2 cos² θ=1+cos 2θ=1+$V_c/V_w$>1. For the large aperture cone the wave path is described by the same expression only it is maximal for peripheral (edge) rays and decreases for paraxial rays: (0)/l(r)=2 cos² θ=1+cos 2θ=1−$V_c/V_w$<1.

Because the wave path is different for different rays it is convenient to introduce the average wave path $\bar{l}=\bar{l}(r,\theta)$ which is predominantly a function of the cone geometry. By definition:

$$\bar{l} = \frac{1}{r}\int_0^r l(x)dx = \frac{r}{\sin 2\theta}\left(1 + \frac{1}{2}\cos 2\theta\right) \quad (20)$$

For the phase-matched cone cos 2θ=±$V_c/V_w$, sin 2θ= $\sqrt{1-(V_c/V_w)^2}$, with a plus sign for the small aperture angle cone and a minus sign for the large aperture angle cone. It shows that for the same cone base size the average wave path in the large aperture angle cone is less than for the small aperture angle cone, which can be important under high attenuation. The "efficiency" ratio between the large aperture cone and the small aperture cone is (1−$V_c/2V_w$)/(1+$V_c/2V_w$)<1.

Guided Wave Leakage Back to the Phase Matched Cone

Figure 27:
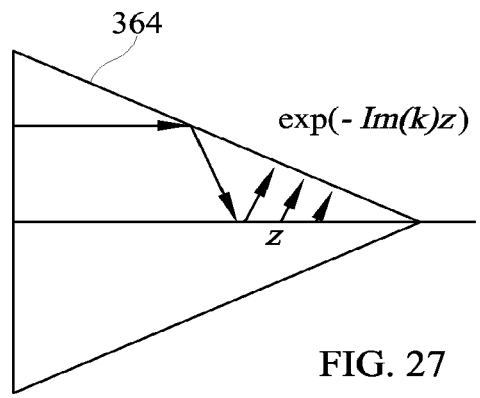
FIG. 27 is a cross-section illustration of re-radiation (leakage) of a guided wave back to a cone.

Another reason for decreasing the guided wave amplitude is that the guided wave excited in the wire can reradiate (leak) back to a cone, e.g., as shown by cone 364 in FIG. 27. This reradiated part of the wave can be lost or can cause parasitic reflections. The decrease in the guided wave amplitude is proportional to exp(−Im(k)z) where Im(k) is the imaginary part of wavenumber k of the guided wave and z is the leakage distance (propagation distance of the guided wave where the wire contacts with the cone). It is clear that as the guided wave leaves the cone its leakage stops because of the huge impedance difference at the wire-air interface. The leakage distance z is different for paraxial and edge rays and is also different for the small and large aperture angles cones.

Figure 28:
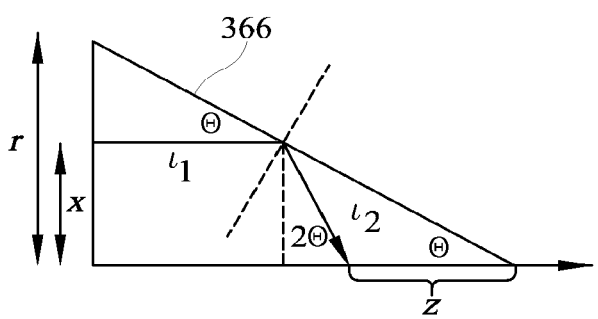
FIGS. 28 and 29 are cross-section illustrations of leakage distance in small and large aperture cones.

For a small aperture angle phase matched cone (e.g., cone 366 of FIG. 28), calculation of the leakage distance gives the following result:

$$z(x) = \frac{x}{\tan\theta} - \frac{x}{\tan 2\theta} = \frac{x}{\sin 2\theta} \quad (21)$$

For the paraxial rays (x=0) z(0)=0 and for the edge rays (x=r) z(r)=r/sin 2θ. The average leakage distance is $$\bar{z} = \frac{1}{r}\int_0^r z(x)dx = \frac{r}{2\sin 2\theta} \quad (22)$$

Figure 29:
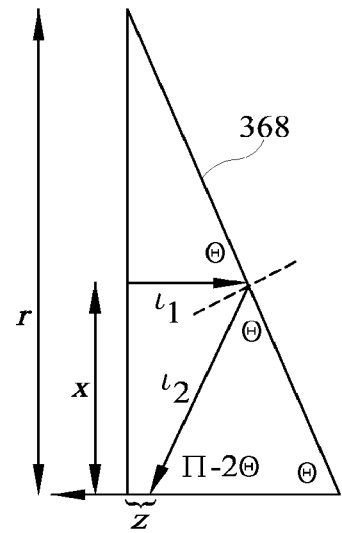

For a large aperture angle phase matched cone (e.g., cone 368 of FIG. 29), calculation of the leakage distance gives the following result:

$$z(x) = \frac{r-x}{\tan\theta} + \frac{x}{\tan 2\theta} = \frac{r}{\tan\theta} - \frac{x}{\sin 2\theta} \quad (23)$$

For the paraxial rays (x=0), z(0)=r/tan θ and for the edge rays ($x_e$=r(1+cos 2θ)) z($x_e$)=0. The edge distance $x_e$ is defined from the conditions that the reflected edge ray drops on the wire-cone base intersection point with zero leakage distance (see FIG. 10). If the transducer radius is larger than then $x_e$ the rays from outer transducer rim will not reach the wire and they will be lost.

The average leakage distance can be computed by:

$$\bar{z} = \frac{1}{x_e}\int_0^{x_e} z(x)dx = \frac{r}{2\tan\theta} \quad (24)$$

Again, the average leakage distance for the large aperture cone is less than for the small aperture cone and their ratio is equal to 1+cos 2θ=1−$V_c/V_w$<1.

Determining Optimal Transducer and Cone Size

In general, the amplitude A of the guided wave depends on the transducer size, attenuation in the cone and the leakage from the wire back to the cone. It can be presented as:

$$A \sim S\ \exp(-\alpha l - k''z) \quad (25)$$

where s is the transducer operating area (for different setups it can be the whole transducer area or less), α is the frequency dependent attenuation coefficient, k"=Im(k) is the frequency dependent imaginary part of the guided wavenumber k, l is the average wave path from the transducer to the wire in the cone, and z is the average leakage distance. Both average distances are proportional to the cone size or ~r,z~r, where r is the cone base radius. One may consider three different designs where 1) the cone base radius r is larger than the transducer radius α, 2) the cone base radius r is equal to the transducer radius α, 3) the cone base radius r is less than the transducer radius α.

Figure 30:
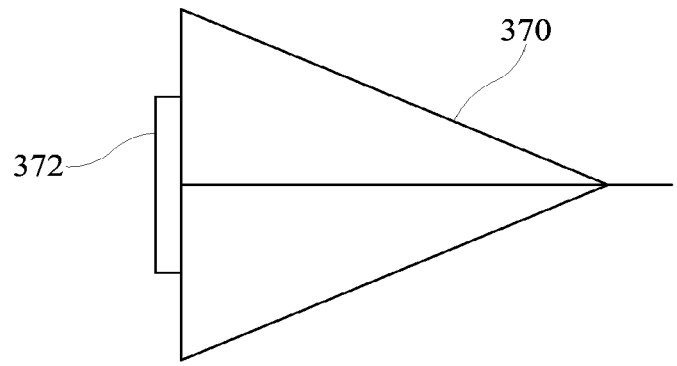
FIGS. 30-32 are cross-section illustrations of different relative sizes of phase matched cones and transducers.

½" Diameter Transducer and 1" Phase Matched Cone— For this design, illustrated by cone 370 and transducer 372 in FIG. 30, the whole transducer area radiates ultrasonic waves into the cone (S~a²) and the guided wave amplitude is:

$$A_1 \sim a^2\ \exp(-\alpha l_1 - k''z_1) \quad (26)$$

This has been found to be sub-optimal based on the efficiency criteria. Although the whole transducer area is in contact with the phase matched cone, the path length from the transducer to the wire is longer due to the larger radius. For Alumilite Replicator 495 ($\theta=31.6°$) $l_1 \approx 19$ mm and the amplitude decrease because of attenuation is $\exp(-\alpha l_1) \approx 1/10$ for 2 MHz and $\exp(-\alpha l_1) \approx 1/30$ for 3 MHz. Even for Plexiglas (which has very low attenuation, for a plastic) amplitude drops by approximately a factor of 3 because of attenuation. The signal will attenuate again by the same factor when receiving, so the total system signal drop is quadratic $\sim A_1^2$. The losses because of leakage can be the same order or even higher. Thus, using a cone larger than the transducer has been found to be problematic.

Figure 31:
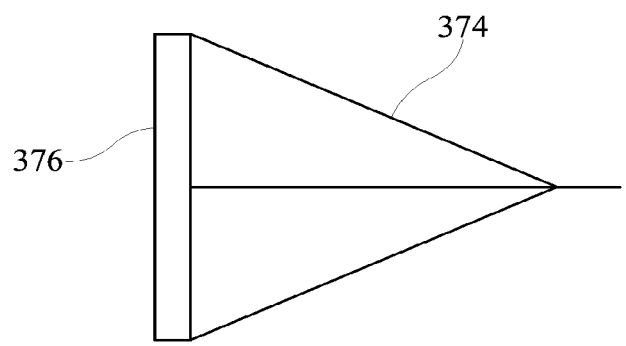

½" Diameter Transducer and ½" Phase Matched Cone—This design, illustrated by cone 374 and transducer 376 in FIG. 31, was found to be more promising because it still uses the whole transducer area but it decreases the losses because of lower attenuation and leakage. The amplitude is:

$$A_2 \sim a^2 \exp(-\alpha l_2 - k''z_2) \quad (27)$$

For Alumilite Replicator 495 ($\theta=31.6°$) $l_1 \approx 9$ mm and the amplitude decrease due to attenuation is $\exp(-\alpha l_1) \approx 1/3$ for 2 MHz and $\exp(-\alpha l_1) \approx 1/5$ for 3 MHz. There appears to be an advantage to using this setup over using a cone larger than the transducer, as the amplitude ratio because of attenuation is $A_2/A_1 \approx 3$ for 2 MHz and $A_2/A_1 \approx 6$ for 3 MHz. The total signal improvements (without leakage effect) will be $(A_2/A_1)^2 \approx 10$ for 2 MHz and $(A_2/A_1)^2 \approx 36$ for 3 MHz. For Plexiglas this effect will be less, but decreasing the leakage distance is still important.

Figure 32:
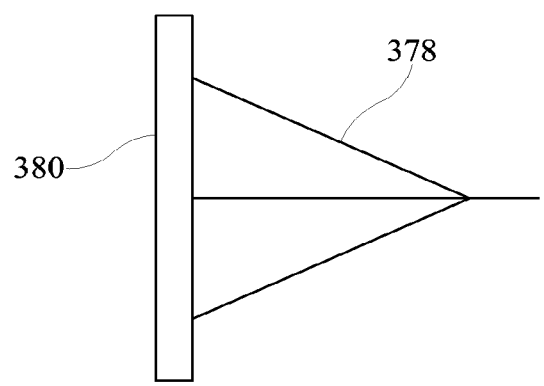

½" Diameter Transducer and Smaller Phase Matched Cone—With this design, illustrated by cone 378 and transducer 380 in FIG. 32, the entire transducer surface does not create a wave in the cone, $S \sim r^2$ and:

$$A_3 \sim r^2 \exp(-\alpha l_3 - k''z_3) \quad (28)$$

The amplitude may degrade because the transducer effective area is now less. The amplitude decreases but there are reduced attenuation losses and leakage as well. The amplitude $A_3$ presents a product of two terms, one of them grows with increasing the cone base area as $r^2$, another term drops exponentially as the cone size increases. This function has a maximum which can be calculated by taking the derivative and making it zero.

As a result one can obtain the cone size where the amplitude is maximal, as follows:

$$r_{max} = \frac{2\sin 2\theta}{\alpha(2+\cos 2\theta)+k''} \quad (29)$$

which is a function of only the cone and wire material properties and frequency. If this radius is less than the transducer radius a then setup 3 is better than setup 2 ($r=\alpha$); this can be the case for high attenuation materials and high leakage. In the opposite case it may be better to use a cone with the same base size as the transducer.

As a result, it is believed that the large aperture cone is more efficient because the wave path is shorter and attenuation is lower, and the average leakage distance is shorter and less energy from the wire reradiates back to the cone. Of note, however, the large aperture cone requires the use of a transducer with a hole in the center, e.g., a ring transducer, which may complicate the construction of the transducer in some applications. In addition, in many commercially available COTS ultrasonic inspection transducers, the back reflections off the piezoelectric element have been optimized and the output of the transducer has been matched to the surface, so small aperture angle transducers may be desirable in some applications due to these practical considerations.

Conclusion

While the present invention has been illustrated by a description of the various embodiments and examples, and while these embodiments have been described in considerable detail, it is not the intention of the applicants to restrict or in any way limit the scope of the appended claims to such detail. Additional advantages and modifications will readily appear to those skilled in the art. For example, while the attachment plates, housings, and diaphragms of some embodiments consistent with the invention have been described as individually defined components, embodiments comprising a housing, attachment plate, and/or diaphragm integrally formed as substantially uniform are contemplated. As such, in some embodiments, a sensor may comprise a housing including a diaphragm, and/or an attachment plate formed thereon.

Moreover, while attachment plates consistent with some embodiments of the invention may be configured as shown for example in FIG. 1, other configurations are contemplated. As such, attachment plates consistent with some embodiments of the invention are configured to secure one or more wires in tension, and may be configured in any suitable manner for providing attachment points for such wires. Thus, an attachment plate consistent with the invention need not be a separate planar member as shown in FIG. 1, but instead may have other geometries, and may be disposed integrally on a housing or other component in a sensor. Practically any component that provides a point of attachment for a wire may be used as an attachment plate in embodiments consistent with the invention.

Moreover, sensors and sensing methods consistent with the invention may be used in sensing environments that conventional sensors and sensing methods generally provide inaccurate results and/or fail completely. Embodiments consistent with the invention may be utilized in a variety of applications where the sensing locations typically are too harsh for conventional sensors and/or sensing methods. Harsh sensing environments typically include one or more extreme environmental conditions that cause inaccurate readings and/or failure of conventions sensors, extreme environmental conditions generally problematic for conventional sensors include, for example, high temperature, high pressure, high strain, high vibration, wide variations in temperature during operation (i.e. broad temperature range), wide variations in pressure during operation (i.e. broad pressure range), etc. As such, sensors and sensing methods consistent with the invention may be utilized in such harsh sensing environments including, for example, high temperature, pressure, vibration, and/or strain locations in engines (e.g. combustion chambers of aero gas turbine engines), high temperature, pressure, vibration, and/or strain locations in industrial machinery, etc.

As sensors and sensing methods consistent with the invention may transmit ultrasonic signals through wires of substantial length, controllers and or other devices used to analyze the ultrasonic signals to determine a measurement of one or more environmental conditions of a harsh sensing location may be remote from the harsh sensing location thereby increasing the reliability of components that may be particularly sensitive to the environmental conditions of the harsh sensing location. Therefore, sensors and sensing methods consistent with the invention may be utilized in a wide variety of applications to provide improved sensors and sensing methods as compared to conventional sensors and sensing methods. In addition, sensors and sensing methods consistent with the invention may be utilized in a wide variety of applications where conventional sensing technology is unreliable, inaccurate and/or inoperable. Thus, the invention in its broader aspects is therefore not limited to the specific details and representative apparatuses shown and described. Accordingly, departures may be made from such details without departing from the spirit or scope of applicants' general inventive concept.

What is claimed is:

1. A method of measuring an environmental condition with a sensor of the type that includes a wire having an ultrasonic signal transmission characteristic that varies in response to the environmental condition, the method comprising:
    sensing a resonant frequency of ultrasonic energy propagated through the wire in a positive feedback loop while at least a portion of the wire is subjected to the environmental condition; and
    determining a value for the environmental condition based upon the sensed resonant frequency.

2. The method of claim 1, further comprising exciting the wire using the positive feedback loop.

3. The method of claim 2, further comprising amplifying a feedback signal in the positive feedback loop using an amplifier.

4. The method of claim 1, wherein the resonant frequency is a first resonant frequency, the method further comprising:
    sensing at least one additional resonant frequency of ultrasonic energy propagated through the wire in the positive feedback loop, and
    compensating for temperature by separating an effect of temperature on the wire from an effect of strain on the wire based on the sensed first and at least one additional resonant frequencies.

5. The method of claim 1, wherein a portion of the wire is coupled to the sensor to exhibit a varying ultrasonic signal transmission characteristic responsive to a force applied to the sensor, and the environmental condition is a pressure, an acceleration or a force measurement.

6. The method of claim 1, wherein the ultrasonic signal transmission characteristic includes phase of the ultrasonic signal, amplitude of the ultrasonic signal, frequency of the ultrasonic signal, or propagation delay of the ultrasonic signal.

7. The method of claim 1, wherein the resonant frequency is a first frequency, the method further comprising:
    sensing a second frequency of ultrasonic energy propagated through the wire, and
    compensating for temperature by separating an effect of temperature on the wire from an effect of strain on the wire based on the first and second frequencies.

8. The method of claim 7, wherein the second frequency is a second resonant frequency of ultrasonic energy propagated through the wire in the positive feedback loop.

9. An apparatus, comprising:
    a waveguide wire in communication with transmission and receiver logic through at least one transducer in a positive feedback loop, wherein the waveguide wire has an ultrasonic signal transmission characteristic that varies in response to an environmental condition; and
    control logic coupled to the transmission and receiver logic and configured to determine a value for the environmental condition based upon a sensed resonant frequency of ultrasonic energy propagated through the waveguide wire in a positive feedback loop while at least a portion of the waveguide wire is subjected to the environmental condition.

10. The apparatus of claim 9, wherein the control logic is further configured to excite the wire using the positive feedback loop.

11. The apparatus of claim 10, further comprising an amplifier configured to amplify a feedback signal in the positive feedback loop.

12. The apparatus of claim 9, wherein the resonant frequency is a first resonant frequency, and wherein the control logic is further configured to sense at least one additional resonant frequency of ultrasonic energy propagated through the wire in the positive feedback loop, and compensate for temperature by separating an effect of temperature on the wire from an effect of strain on the wire based on the sensed first and at least one additional resonant frequencies.

13. The apparatus of claim 9, wherein a portion of the wire is coupled to a sensor to exhibit a varying ultrasonic signal transmission characteristic responsive to a force applied to the sensor, and the environmental condition is a pressure, an acceleration or a force measurement.

14. The apparatus of claim 9, wherein the ultrasonic signal transmission characteristic includes phase of the ultrasonic signal, amplitude of the ultrasonic signal, frequency of the ultrasonic signal, or propagation delay of the ultrasonic signal.

15. An apparatus, comprising:
    transmission and receiver logic configured to communicate with a waveguide wire through at least one transducer in a positive feedback loop, wherein the waveguide wire has an ultrasonic signal transmission characteristic that varies in response to an environmental condition; and
    control logic coupled to the transmission and receiver logic and configured to determine a value for the environmental condition based upon a sensed resonant frequency of ultrasonic energy propagated through the waveguide wire in a positive feedback loop while at least a portion of the waveguide wire is subjected to the environmental condition.

16. The apparatus of claim 15, wherein the control logic is further configured to excite the wire using the positive feedback loop.

17. The apparatus of claim 16, further comprising an amplifier configured to amplify a feedback signal in the positive feedback loop.

18. The apparatus of claim 15, wherein the resonant frequency is a first resonant frequency, and wherein the control logic is further configured to sense at least one additional resonant frequency of ultrasonic energy propagated through the wire in the positive feedback loop, and compensate for temperature by separating an effect of temperature on the wire from an effect of strain on the wire based on the sensed first and at least one additional resonant frequencies.

19. The apparatus of claim 15, wherein a portion of the wire is coupled to a sensor to exhibit a varying ultrasonic signal transmission characteristic responsive to a force applied to the sensor, and the environmental condition is a pressure, an acceleration or a force measurement.

20. The apparatus of claim 15, wherein the ultrasonic signal transmission characteristic includes phase of the ultrasonic signal, amplitude of the ultrasonic signal, frequency of the ultrasonic signal, or propagation delay of the ultrasonic signal.

\* \* \* \* \*